United States Patent [19]

Wall

[11] 4,115,877

[45] Sep. 26, 1978

[54] LIQUID LEVEL SENSING DEVICE AND SWIMMING POOL WATER CIRCULATION SYSTEMS CONTAINING THE SAME

[76] Inventor: Frederick Wall, 707 Belleview Rd., Rock Hill, S.C. 29730

[21] Appl. No.: 780,742

[22] Filed: Mar. 24, 1977

[51] Int. Cl.² ........................ E04H 3/16; G01F 23/10
[52] U.S. Cl. .................................... 4/172.17; 73/301; 73/304 C; 210/169
[58] Field of Search ............... 4/172.17, 172; 210/169; 137/392; 73/299, 304 C, 398 C, 401, 301; 361/283, 284

[56] References Cited

U.S. PATENT DOCUMENTS

| | | | |
|---|---|---|---|
| 2,354,964 | 8/1944 | Ostermann et al. | 73/304 C |
| 2,651,204 | 9/1953 | Dickinson | 73/398 C |
| 2,704,342 | 3/1955 | Fielden | 73/304 C |
| 2,863,472 | 12/1958 | Coles et al. | 137/392 |
| 2,904,732 | 9/1959 | Houghton | 73/304 CX |
| 3,134,262 | 5/1964 | Dworzan et al. | 73/398 CX |
| 3,190,122 | 6/1965 | Edwards | 73/398 C |
| 3,537,111 | 11/1970 | Whitten, Jr. | 4/172.17 |
| 3,540,277 | 11/1970 | Roth et al. | 73/304 CX |
| 3,668,713 | 6/1972 | Baker | 4/172.17 |
| 3,838,601 | 10/1974 | Dorman | 73/401 |
| 3,848,627 | 11/1974 | Page | 137/392 |

FOREIGN PATENT DOCUMENTS 243,318  12/1926  United Kingdom .................. 73/304 C Primary Examiner—Daniel M. Yasich

[57] ABSTRACT

A liquid level sensing device is provided comprising, in combination, a U-tube having two substantially vertical legs in fluid interconnection at their lower ends; a variable capacitor in one leg of the U-tube, comprising two spaced electrodes receiving a dielectric liquid therebetween; a first mobile body in said one leg of a first dielectric liquid capable of rising and falling within the space between the electrodes and to a level at which it partially or fully fills the space; a second mobile body in said one leg of a second liquid having a higher density than and immiscible with the dielectric liquid, and having an upper surface on which rests the first body of dielectric liquid; a third mobile body in the second leg of a third liquid immiscible with the second liquid and disposed in operative relationship with the second body of liquid; and a fluid pressure communication between said third body and a fourth body of the same or different liquid whose liquid level is to be sensed, so that the relative level of said first body of first liquid in the space between the electrodes in the variable capacitor is related to liquid level in said fourth body, communicated as fluid pressure via the fluid pressure communication to said third body, and thereby moving the second body of liquid and the first body of liquid in the U-tube to a level related to liquid level in said fourth body and corresponding to a capacitance of the variable capacitor.

26 Claims, 13 Drawing Figures

LIQUID LEVEL SENSING DEVICE AND SWIMMING POOL WATER CIRCULATION SYSTEMS CONTAINING THE SAME

Automatic control at all times of the water level in a pool requires prompt response to changes in operating conditions, and is not easy to achieve. Many attempts have been made, but a fully automated response to all use conditions has not in fact been obtained.

Establishment and maintenance of the water level in a pool when the pool is quiescent is relatively easy. One system for automatically maintaining pool level, sensing pool level by a float in a surge and level control tank, and feeling make-up water to the pool by a float-operated valve, is described in U.S. Pat. No. 3,386,107 to G. R. Whitten Jr., patented June 4, 1968. It is desirable of course to avoid placing a float directly in the pool, since not only would a float be in the way of swimmers, but the float would also be subject to changes in water level due to wave action. These problems are avoided by placing the float in a separate surge and level control tank, connected to the pool below the surface, so that the control responds only to static pool level. When the static level is below a predetermined level, make-up water is added even though the pool surface may be turbulent. In the system of this patent, the make-up water is added to the control chamber in the tank, in which the float sinks to detect a low water level, and excess water is also withdrawn by overflow or drain provided through the control tank. However, as noted by Whitten Jr. in a later U.S. Pat. No. 3,537,111 patented Nov. 3, 1970, the cost of such an elaborate surge and level control tank adds substantially to the total construction cost of the pool.

A further system noted by Whitten Jr. in U.S. Pat. No. 3,537,111 is to provide a sump separated from the pool by a ledge which sets a level for overflow, and a make-up water supply valve feeding directly into the sump under the control of a float. A drain valve is connected to the same float for draining the sump to a recirculating pump whenever the sump tends to overfill. However, this sytem does not correct flooding of the sump to the pool level by rain or overfilling, and no peripheral gutter is provided in this system, which also requires the construction of a separate sump tank which has to be placed at pool side, rather than located remotely at a location which would be both more convenient and less obstructive of the deck around the pool.

Accordingly, in U.S. Pat. No. 3,537,111, patented Nov. 3, 1970, Whitten Jr. proposed a modified system in which all water level sensors sense water level in the drainage gutter, and not in the pool. The level of drainage flow in the single peripheral gutter is detected at one level or a range of levels. The gutter has an overflow lip or weir for skimming flow at the desired pool height, and delivers overflow to a recirculating pump and filter, which may also draw water from drains under the pool surface. The detecting means controls a valve in a make-up water supply line which either feeds the pool directly, or feeds the recirculating pump, if prefiltration is desired. The control is arranged to open the make-up valve, if the drainage flow falls below a level that will guarantee maintenance of continuous overflow all around the periphery of the pool, taking the provision of a hydraulic gradient in the gutter into account. If the drainage flow rises beyond a normal operating level, which is sufficiently lower than the gutter lip to allow ample space in the gutter to receive abnormal flow caused by pool surge, the control closes the make-up valve and discontinues the supply to the pool.

Means is also provided for increasing the rate of drainage of the gutter under flooding conditions, detecting the level of the drainage flow to control the main drain valve. The control is arranged to partially close the main drain valve to reduce the proportion of the recirculating flow which is drawn from the main drain whenever the gutter flow substantially fills the gutter space reserved for surge and approaches the level of the overflow drain pipe. The effect of this is to increase the rate of flow taken by the recirculating pump from the gutter, and thus hasten a drop in the drainage overflow in the gutter to a suitable operating level. As this level returns to normal, the control reopens the main drain valve to restore the original proportioning of the recirculating flow taken from the gutter and the pool.

The system does however have an inadequate gutter capacity to respond to high gutter flooding conditions.

Higher than normal pool levels, substantially higher than the overflow lip of the gutter, must be prevented from entering the gutter, therefore, by covering the gutter with a grille having drain holes whose total area is calculated to admit only the maximum recirculation flow rate that can be handled by the gutter. Such water is retained on the grille, and accordingly washes back to the pool without entering the gutter, which is undesirable, since this washes dirt and debris collected on the grille back into the pool, and accordingly fails to meet modern health code requirements.

In order to prevent this, it is necessary to provide a gutter system of considerably increased capacity, such as a double gutter of the type provided, for example, in U.S. Pat. Nos. 3,668,712, 3,668,713, 3,668,714 and 3,815,160 to Baker. However, the control system of U.S. Pat. No. 3,537,111 is not suitable for use in a double gutter pool.

In a swimming pool water circulation system, the provision of sensors capable of detecting water level at any given stage of the circulation system, such as, for example, in the swimming pool, in the gutter, in the filter tank, and elsewhere, requires either that the sensing equipment be placed directly in the body of water at the stage where water level is to be detected, or that a separate chamber be provided in fluid communication with the first body, so that the water level therein is the same as the water level in the body of water whose level is to be detected. This means either that the sensing equipment must take up valuable space, or a special chamber has to be provided for the sensing equipment. Neither is an entirely satisfactory alternative, because each adds to the expense of the pool, and also to the maintenance cost. Moreover, the provision of sensors directly in the body of water whose level is to be detected is not always possible, particularly when the body of water is the swimming pool itself, for the reasons noted above.

The water level sensing equipment has to be either mechanical or electrical. Mechanical level sensors, such as floats and similar contrivances, are liable to get out of order, and then malfunction. Moving parts can be bent or even jammed when debris floating in the water encounters the float and lodges against either it or the parts linking the float to the sensing system. Metal parts can corrode, or acquire weight-increasing coatings, and then malfunction.

Electrical devices are usually in the form of probes or electrodes, which are immersed in the water body whose level is to be detected. Since a given probe or electrode can only detect water level when the water reaches the probe, one sensor is needed for each different water level to be detected, so that a large number of probes or electrodes may be required. This virtually dictates that the probes be set up in a special chamber for the purpose. Nonetheless, this type of system poses problems of its own.

It is very difficult to manufacture electric probes which are sufficiently sensitive to respond immediately and precisely to a given level of water, after the water contacts the probe or electrode. Moreover, the electrode surface can become coated, or corroded, or scaled, as a result of which the system may malfunction, or even become inoperative. It is also difficult to position the electrode so as to detect the precise level desired, and it is not easy to adjust the positioning of the electrode to detect different levels and maintain such positions, since this requires that the probes be securely fastened, whereas the fact that the probes must be adjustable in position means that the electrodes cannot really be fastened in a permanent way, and therefore can work loose. Besides these problems, a voltage must be applied across the electrodes, and if the electrical conductivity of the liquid is low, a rather high voltage, as high as 150 volts, may be required. This is not always acceptable, because of the danger of setting up stray currents through the body of water, which can shock the swimmers.

In accordance with the instant invention, a liquid level sensing device is provided that overcomes all of these problems. The device of the invention has no moving parts, and no electric current is passed therethrough, in contact with the water whose level is to be sensed. Moreover, the device requires very little space, and does not have to be placed directly in or even near to the body of water whose level is to be detected, but can be placed in fluid pressure communication via a passage or tube within that body, and is therefore readily concealed and stowed out of the way, even in a swimming pool. There are no mechanical parts, and the electrical circuitry is completely shielded from contact with water. Since no electric parts are in contact with water, they are not subject to corrosion or the acquisition of coatings or deposits. While such may occur in the portions of the device in contact with water, they do not affect the operation of the device in any respect.

The liquid level sensing device in accordance with the invention comprises, in combination, a U-tube having substantially vertical legs in fluid interconnection at their lower ends; a variable capacitor in one leg of the U-tube, comprising two spaced electrodes receiving a dielectric liquid therebetween; a first mobile body in said one leg of a first dielectric liquid capable of rising and falling within the space between the electrodes and to a level at which it partially or fully fills the space; a second mobile body in said one leg of a second liquid having a higher density than and immiscible with the dielectric liquid and having an upper surface on which rests the first body of dielectric liquid; a third mobile body in the second leg of a third liquid immiscible with the second liquid and disposed in operative relationship with the second body of liquid; and a fluid pressure communication between said third body and a fourth body of the same or different liquid whose liquid level is to be sensed, so that the relative level of said first body of first liquid in the space between the electrodes in the variable capacitor is related to liquid level in said fourth body, communicated as fluid pressure via the fluid pressure communication to said third body, and thereby moving the second body of liquid and the first body of liquid in the U-tube to a level related to liquid level in said fourth body and corresponding to a capacitance of the variable capacitor.

Theoretically, there are an infinite number of levels of dielectric liquid in the space between the electrodes of the variable capacitor, each level capable of modifying the capacitance of the capacitor by a measurable amount. Accordingly, by appropriate electrical circuitry responsive to such capacitance changes, a sequence of operations in a water circulation system can be set up for each new level sensed in the body of liquid. Consequently, one such device can take the place of the battery of sensors required in prior systems.

Consequently, and further in accordance with the invention, a fully automated water level and skimming flow perimeter gutter control system for swimming pools is provided, comprising a gutter receiving overflow, including surge flow and/or skimming flow, across the top of the perimeter gutter and adequate for normal and surge flow conditions, and optionally, a second gutter receiving skimming flow and also providing additional gutter capacity for extraordinary overflow, including relief flow from the first gutter in the event of considerable activity in the pool, in combination with a level-sensing device as defined above operating from fluid pressure corresponding to the level of water in the pool overflow, such as in the gutter conduit, or in a balance tank, or in a vacuum filter tank, to control the skimming flow and water recirculation between the pool and the gutter, and feed from a water make-up supply.

To control normal pool water level, the device senses a first level of water in the overflow, such as in the gutter or balance tank or vacuum filter tank, corresponding to below-normal skimming flow, and when this is below a predetermined level gives an electric signal that opens a make-up valve controlling feed of fresh water from a supply or the water main.

When the pool level reaches a second higher overflow level at which skimming flow via surge weirs or a skimming gutter proceeds, and overflows into the gutter, the device senses that new level and gives a signal that closes the make-up water valve. The device allows this equilibrium condition to continue while skimming flow remains at a rate corresponding to a quiescent pool condition.

Any increase in pool activity above the quiescent condition results in a greater-than-normal skimming flow through the surge weirs, and/or skimming gutter, and this in turn causes the water overflow level to rise still further, in the gutter and elsewhere downstream.

In the event the gutter system includes one or more surge weirs, arranged in weir passages, the device senses a third higher overflow water level, corresponding to a low activity pool condition, in which the overflow level is above the normal skimming flow level sensed in the pool by the device. When the overflow level reaches the third level, the device gives an electric signal that actuates a mechanism closing off the surge weirs, arresting skimming flow through the weirs, and retaining the water in the pool, but allowing skimming flow and/or surges to proceed across the top of the perimeter gutter, into the gutter.

Light pool activity, if increased further, will increase the overflow water level such as in the gutter to a level corresponding to moderate pool activity. If a two-gutter system is provided, the water level in the first gutter will eventually reach the flooding level, and thus an overflow connection is provided between the first and second gutters, so that such water instead of flooding the first gutter and returning to the pool flows from the first gutter to the second gutter.

Under moderate pool activity, more water flows into the gutter, and eventually taxes the normal water recirculation system, which receives flow not only from the gutter but also from the main drain in the pool. Consequently, the overflow water level, such as in the gutter, rises still further, until it reaches a fourth overflow water level. The device senses when this water level is reached, and gives an electric signal to increase the recirculation system capacity for overflow, such as gutter flow, by closing off the main drain valve, causing all recirculation water between the pool and the pool recirculation system to flow into the system from the gutter. If the main drain were not cut off, the recirculation system would be unable to accommodate the increased overflow, in the case, gutter flow, and the overflow would begin to back up in the gutter system. Consequently, this device prevents flooding of the gutters and back-wash to the pool under the increased gutter flow, as a result of this higher level of activity.

Alternatively, or in addition, the device can increase recirculation system capacity for overflow by giving an electric signal that opens a recirculating flow throttling control valve on the return line of the recirculation system. This valve can at normal quiescent or light pool activity provide a normal recirculation flow, but upon demand, at moderate or heavy pool activity, provide a higher total recirculation flow. The throttling valve thus makes it possible to design the recirculation system to accommodate any excess flow above the normal recirculation rate, as may be required according to the amount of pool activity to be expected, or the amount of skimming flow across the top of the perimeter gutter.

To avoid the restriction of a limited flow through a filter, a by-pass line can also be incorporated to allow some or all excess overflow to bypass the filter.

Accordingly, upon a further increase in pool activity to the maximum, or operation of the pool at the rim flow level, providing skimming flow across the top of the gutter, the amount of overflow into the gutter increases still further, Eventually, such activity raises the overflow water level such as in the gutter to a fifth overflow water level, at which the capacity of the recirculation system is exceeded, and must be increased further to prevent gutter flooding and wash back. At this level, the device gives an electric signal that opens the recirculating flow throttling control valve on the return line of the recirculation system, to increase the amount of water drawn through the filter, and/or opens a bypass line to bypass the filter, so as to permit the recirculation system to accommodate the excess overflow generated under such conditions.

The device of the invention is double-acting, i.e., actuated at the predetermined water level, whether that level is reached by a declining flow or by a rising flow. Consequently, a declining flow reverses the sequence of actuation response noted above.

Accordingly, the device in accordance with the invention makes possible a control system which automatically accommodates any amount of pool activity without gutter flooding or washing back of debris and contaminants in the gutters into the pool, permitting skimming flow through surge weirs or over the rim of the perimeter gutter, as may be desired.

The automated pool perimeter skimming gutter water level control system of the invention accordingly comprises, in combination, a gutter conduit for disposition about the perimeter of a swimming pool, and adapted to carry water at a level below a predetermined level of water in the swimming pool; a retaining wall on the pool side of the gutter conduit, over the top of which wall water may flow from the pool into the gutter conduit, the top of the wall being placed at a height to maintain a predetermined water level in the pool, to provide a skimming flow of water over the top at such predetermined water level in the pool, and to allow excessive flows, wave actions and surges to flow over the top of the wall into the gutter conduit; a water cleaning and recirculating system for collecting water from the pool and water flowing into and along the gutter conduit, cleaning it, and returning it to the pool; and the device of the invention sensing, in sequence, a first water level in the overflow downstream of the pool corresponding to a less than the predetermined water level in the pool, and responding by giving an electric signal to feed water to the pool; a second water level in the overflow downstream of the pool characteristic of normal quiescent pool skimming flow and responding by giving an electric signal to stop water feed initiated at the first overflow level; and a third higher water level in the overflow downstream of the pool characteristic of a high degree of water flow wave action and surges into the gutter conduit, and responding by giving an electric signal to increase water recirculation system capacity to recirculate such increased overflow and prevent wash-back from a gutter conduit to the pool.

Another embodiment of automated pool perimeter skimming gutter water level control system of the invention comprises, in combination, a gutter conduit for disposition about the perimeter of a swimming pool, and adapted to carry water at a level below a predetermined level of water in the swimming pool; a retaining wall on the pool side of the gutter conduit, over the top of which wall water may flow from the pool into the gutter conduit; at least one surge weir disposed through the retaining wall below the top thereof, at a height to maintain a predetermined water level in the pool, and to provide a skimming flow of water through the weir at such predetermined water level in the pool, the top of the wall being spaced above the weir at a height to retain the pool water within the pool perimeter when the weir is closed at water flow, wave actions and surges up to a predetermined minimum, while allowing excessive flows, wave actions and surges to flow over the top of the wall into the gutter conduit; a water cleaning and recirculating system for collecting water from the pool and water flowing into and along the gutter conduit, cleaning it, and returning it to the pool; and the device of the invention sensing, in sequence, a first water level in the gutter corresponding to a less than the predetermined water level in the pool, and responding by giving an electric signal to feed water to the pool; a second water level in the gutter characteristic of normal quiescent pool skimming flow and responding by giving an electric signal to stop water feed initiated at the first gutter level; and a third higher water level in the gutter characteristic of a high degree of water flow wave action and surges into the gutter conduit, and responding by giving an electric signal to increase water recirculation system capacity to recirculate such increased gutter flow and prevent wash-back from a gutter conduit to the pool.

In a modification of this embodiment, the device of the invention senses and responds to the following different water levels in the gutter downstream of the pool: a first water level corresponding to a less than the predetermined water level in the pool, and responds to feed water to the pool; a second higher water level in the gutter characteristic of normal quiescent pool skimming flow, and responds to stop water feed initiated by the first overflow sensor; a third higher water level in the gutter characteristic of a low threshhold of pool activity but excessive weir skimming flow, and responds to close at least one weir; and a fourth higher level in the gutter characteristic of a high degree of water flow, wave action and surges into the gutter conduit, and arranged to increase water recirculation system capacity to recirculate such increased overflow and prevent wash-back from a gutter conduit to the pool.

A preferred embodiment of twin-gutter automated pool perimeter skimming gutter water level control system of the invention comprises, in combination, a first gutter conduit for disposition about the perimeter of a swimming pool, and adapted to carry water at a level below a predetermined level of water in the swimming pool; a second gutter conduit for disposition about the perimeter of a swimming pool, and adapted to carry water at a level below a predetermined level of water in the swimming pool; a retaining wall on the pool side of the gutter conduit, over the top of which wall water may flow from the pool into a gutter conduit; the top of the wall being placed at a height to maintain a predetermined water level in the pool, to provide a skimming flow of water at such predetermined water level in the pool, and to allow excessive flows, wave actions, and surges to flow over the top of the wall into a gutter conduit; a water cleaning and recirculating system for collecting water from the pool and water flowing into and along the first and second gutter conduits, cleaning it, and returning it to the pool; and a device of the invention sensing a first water level in the overflow downstream of the pool corresponding to a less than the predetermined water level in the pool, and responding by giving an electric signal to feed water to the pool; a second water level in the overflow downstream of the pool characteristic of normal quiescent pool skimming flow and responding by giving an electric signal to stop water feed; and a third higher level in the overflow downstream of the pool characteristic of a high degree of water flow, wave action and surges into the gutter conduit, and arranged to increase water recirculation system capacity to recirculate such increased overflow and prevent wash-back from a gutter conduit to the pool.

Another embodiment of automated pool perimeter skimming gutter water level control system of the invention comprises, in combination, a first gutter conduit for disposition about the perimeter of a swimming pool, and adapted to carry water at a level below a predetermined level of water in the swimming pool; a retaining wall on the pool side of the gutter conduit over the top of which wall water may flow from the pool into the gutter conduit; a second gutter conduit for disposition about the perimeter of a swimming pool, and adapted to carry water at a level below a predetermined level of water in the swimming pool; at least one surge weir disposed through the retaining wall below the top thereof, at a height to maintain a predetermined water level in the pool, and to provide a skimming flow of water through the weir at such predetermined water level in the pool, the top of the wall being spaced above the weir at a height to retain the pool water within the pool perimeter when the weir is closed at water flows, wave actions and surges up to a predetermined minimum, while allowing excessive flows, wave actions and surges beyond such minimum to flow over the top of the wall into the first gutter conduit; a water cleaning and recirculating system for collecting water from the pool and water flowing into and along the first and second gutter conduits, cleaning it, and returning it to the pool; and a device of the invention sensing a first water level in the overflow downstream of the pool corresponding to a less than the predetermined water level in the pool, and responding by giving an electric signal to feed water to the pool; a second water level in the overflow downstream of the pool corresponding to a second higher water level characteristic of normal quiescent pool skimming flow and responding by giving an electric signal to stop water feed; a third higher level in the overflow downstream of the pool characteristic of a low threshhold of pool activity but excessive weir skimming flow, and responding by giving an electric signal to close at least one weir; and a fourth higher level in the overflow downstream of the pool characteristic of a high degree of water flow, wave action and surges into the first gutter conduit, and responding by giving an electric signal to increase water recirculation system capacity to recirculate such increased overflow and prevent wash-back from a gutter conduit to the pool.

A weir of weirs for skimming flow is not essential, and can be omitted. A skimming flow over the top of the retaining wall can be used instead, as in U.S. Pat. No. 3,815,160. It is also possible to use skimming slots, as in U.S. Pat. Nos. 3,668,712 and 3,668,714, the slots feeding water directly into the second gutter conduit.

The overflow level can be sensed by overflow sensors at any position downstream of the pool where a water level correlated with pool activity and skimming flow exists, and can be detached. One such location is in the gutter. If there be more than one gutter, the second gutter downstream of the first gutter is preferred, but any gutter can be used. Another location is in a balance tank or vacuum filter tank before the pump, receiving gutter flow, in the water recirculation system.

The water level sensing and control system of the invention is applicable to any design of single or multiple gutter perimeter gutter system.

U.S. Pat. No. 3,668,712 to William H. Baker dated June 13, 1972, provides a perimeter skimming gutter for swimming pools including a gutter conduit for disposition about the perimeter of a swimming pool and adapted to carry water at a lever below a predetermined level of water in the swimming pool, a retaining wall on the pool-side of the conduit, over the top of which wall water may flow from the pool into the gutter conduit, and a plurality of narrow elongated substantially horizontally disposed openings through the wall at a height to maintain a predetermined water flow, the top of the wall being spaced above the openings at a height to retain the pool water within the pool perimeter at water flows, wave actions and surges up to a predetermined maximum, while allowing excessive water flows, wave actions, and surges beyond such maximum to flow over the top of the wall into the gutter conduit.

U.S. Pat. No. 3,668,714 to William H. Baker dated June 13, 1972, provides a nonflooding perimeter skimming gutter for swimming pools including a first gutter conduit for disposition about the perimeter of a swimming pool, and adapted to carry water at a level below a predetermined level of water in the swimming pool, a retaining wall on the pool-side of the first gutter conduit over the top of which wall a skimming flow of water may run from the pool into the first gutter conduit, a second gutter conduit adapted to carry water at a level below a predetermined level of water in the first gutter conduit, and a fluid flow connected between the two gutter conduits at such level and below the top of the retaining wall allowing water flow from the first gutter conduit into the second gutter conduit whenever the water level on the first gutter conduit reaches the fluid flow connection, thereby inhibiting filling of the first gutter conduit appreciably above such level.

Both skimming gutter designs are quite satisfactory for most sizes of swimming pool. If their unusually large gutter capacity can at times be exceeded, then the gutter of U.S. Pat. No. 3,815,160 to William H. Baker, dated June 11, 1974, can be used.

This nonflooding perimeter skimming gutter wall permits an adequate skimming action at all times, and also provides for virtually unlimited surge capacity when the pool is in use, without the possibility of the gutter's flooding, or dirt in the gutter's being washed back into the pool. This is accomplished by combining a second gutter conduit within a peripheral wall of the swimming pool, making available for gutter flow the internal volume of the wall, in fluid flow connection with the first gutter conduit, and adapted to receive water from the first gutter conduit whenever the level of water in that gutter exceeds a predetermined maximum, established at the level of the fluid flow connection therebetween. This fluid flow connection is below the top of the retaining wall, so that the water level in the first gutter conduit cannot reach the top of the retaining wall. The second gutter conduit within the wall is entirely separate from the first, and is designed to provide an ample reserve flow capacity to accommodate any heavy or surge action that may be likely to be encountered. The fluid flow connection between the gutter conduits can be arranged to skim the dirt off the top of the first gutter trough, thus assisting in preventing this dirt from being washed back into the pool.

In this gutter system, the water level in the pool is normally maintained at the level at the top of the retaining wall, which consequently serves as a skimmer gutter at the pool perimeter. The fluid flow connection may constitute a second skimming flow outlet, supplementing and continuing the skimming action of the first.

The term "conduit" as used herein is inclusive of open conduits or troughs as well as partially or wholly enclosed conduits.

In a preferred embodiment of the invention the first gutter conduit is an open trough, with at least one fluid flow connection with the second gutter conduit in the form of one of a plurality of openings at the predetermined maximum level of water in the first gutter conduit.

The second gutter conduit preferably is a closed conduit. The second gutter conduit can be within any peripheral wall of the pool. It can, for example, be within the peripheral pool-side retaining wall. It can also be within a peripheral external wall of the gutter, on the side away from the pool.

In a preferred embodiment of the invention, a water-feed conduit is provided in the gutter for feed of fresh water into the pool. This conduit is preferably an integral part of the nonflooding perimeter skimming gutter, at the pool-side retaining wall, admitting water to the pool through the pool-side retaining wall.

In the case where the two gutters are separated by a common wall, the fluid flow connection between the two gutters can be of any configuration, and is in sufficient number and at a high enough level to provide for an adequate flow capacity, to prevent the water level in the first gutter conduit from appreciably exceeding the height of the overflow connection under any water surge or wave conditions in the pool.

The level of the overflow connections with respect to the bottom of the first gutter conduit can be adjustable, so as to provide adjustment of the water level permitted in the first gutter conduit before flow via the overflow connections into the second gutter conduit commences. This adjustment can be provided for by forming the overflow connections as vertical slots or with an extended vertical height, and disposing a movable barrier member over the overflow connections with the opening or openings of the desired size and shape.

Preferred embodiments of the liquid level sensing device and swimming pool water circulation system of the invention are shown in the drawings, in which.

Figure 1:
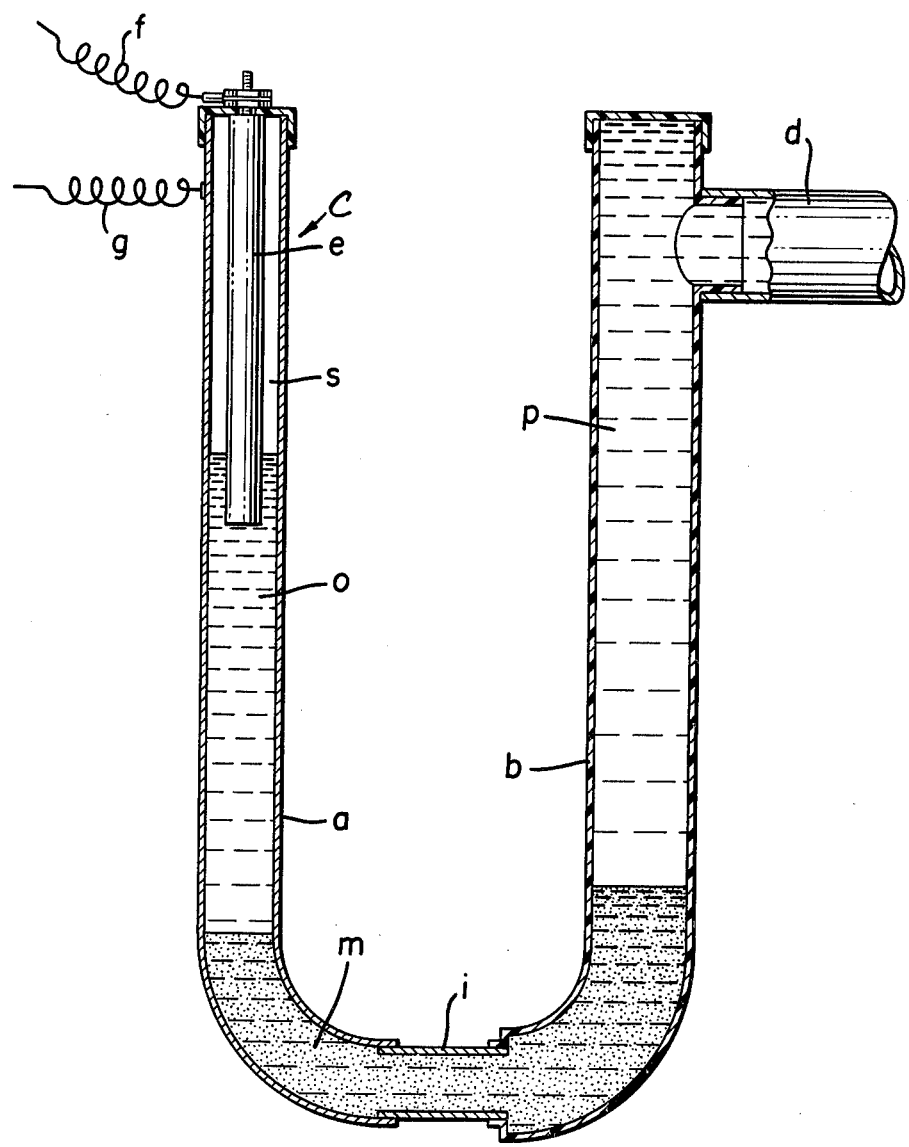
FIG. 1 is a longitudinal sectional view through the U-tube of a device of the invention, showing the variable capacitor and the line connection to the body of liquid, such as water, whose level is to be detected.

The liquid level sensing device shown in FIG. 1 includes a vertical U-tube having two vertical legs a, b, of which leg a is made of electrically conductive metallic material such as a copper tube, in this case ½ inch in diameter, and leg b is made of either electrically conductive or dielectric material, such as copper, plastic, or steel. The leg a is open to atmospheric pressure, and must be electrically conducting since it forms one electrode of the variable capacitor c. The leg b need not be electrically conducting because it forms no part of the electrical system, and can if desired be made of noncorrosive material such as plastic or plastic coated metal to prevent corrosion and deterioration when this leg of the U-tube is in contact via line connection d with a corrosive liquid such as swimming pool water from the water circulation system as in FIGS. 3 to 13.

Inserted at the top end of the first leg a is an electrode e which in this instance is an aluminum rod. There is an electrical connection f to the aluminum rod, in the form of a shielded cable, and a second electrical connection g to the copper tube. These electric connections lead to the electric circuit whose wiring diagram is shown in detail in FIG. 2, as will presently be seen.

The copper tube a and aluminum rod e thus constitute concentric electrodes, with a space s therebetween, and this space is adapted to receive a dielectric liquid, in this instance mineral oil o, which is mobile, and therefore free to rise and fall in the space s between the electrodes a, b, at any particular level. The actual level assumed by the mineral oil in the space s depends in the following way upon the water level in the body of water whose level is to be sensed and controlled.

The body of mineral oil rests on the upper surface of a body of liquid mercury m, which is also mobile and can rise and fall within the leg a of the U-tube. The mercury extends, in fact, through the lower portion of leg a and the interconnection i at the base of the U between the legs a, b into the second leg b of the U-tube. The actual position of the mercury in each leg is dependent upon the weight (pressure) of mineral oil o on its left surface, on the one hand, and the pressure of liquid p on its other surface in the second leg b.

Figure 3:
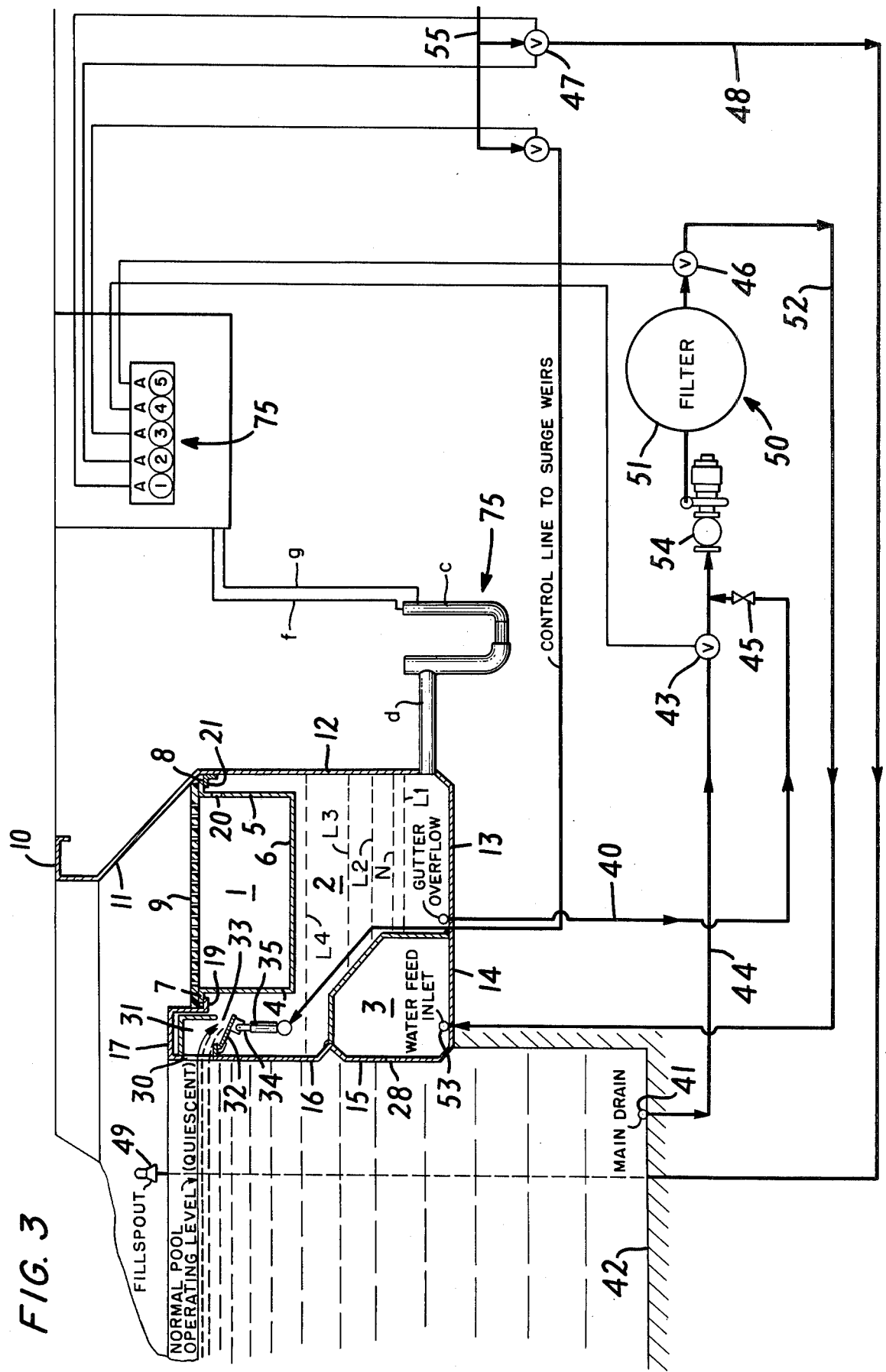
FIG. 3 is a swimming pool water flow circuit diagram, showing a twin-gutter pool perimeter water recirculation system with the automated control system of the invention imposed thereon.
Figure 4:
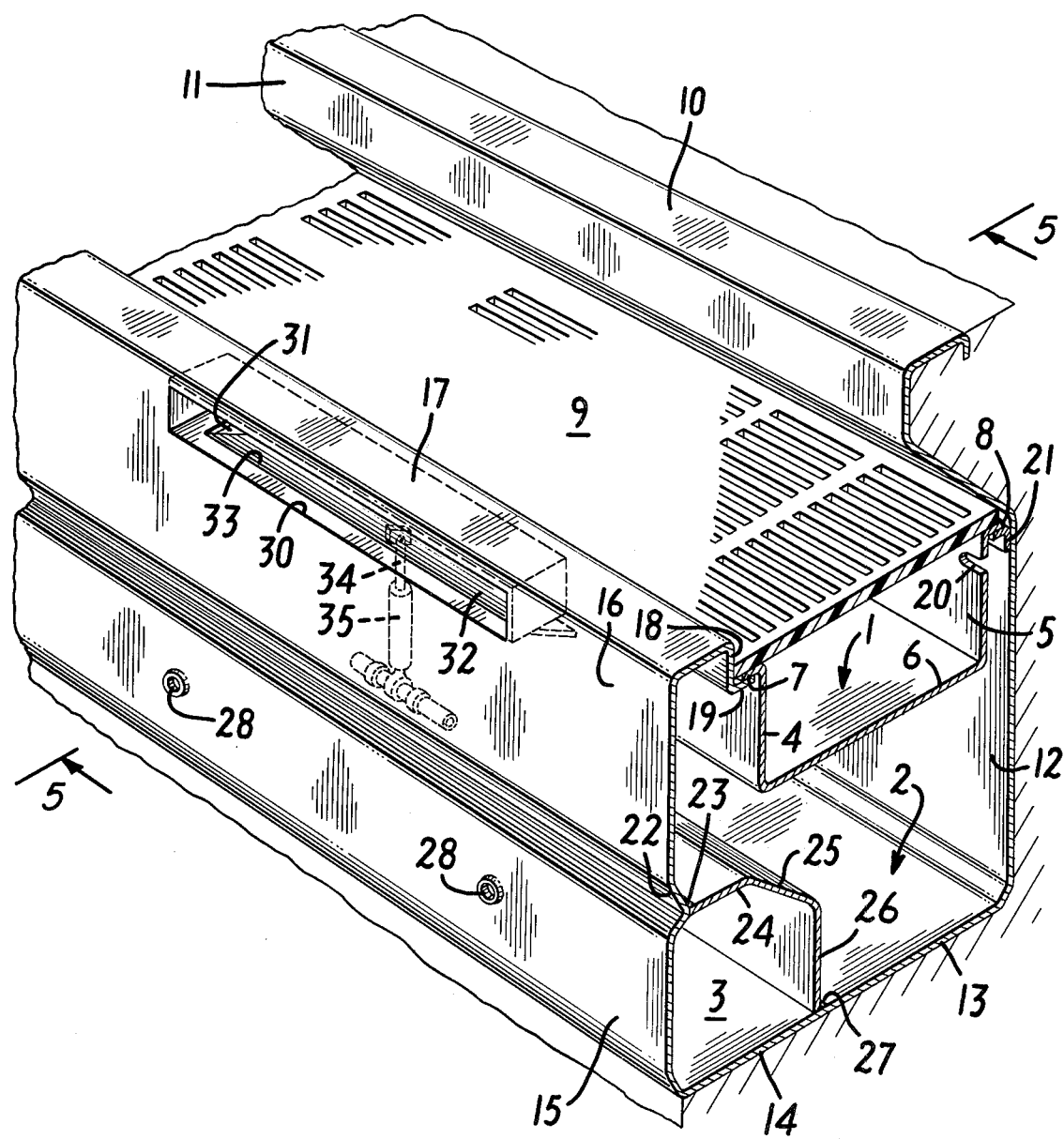
FIG. 4 represents a view of one modular unit of a pool perimeter gutter in accordance with the invention.
Figure 5:
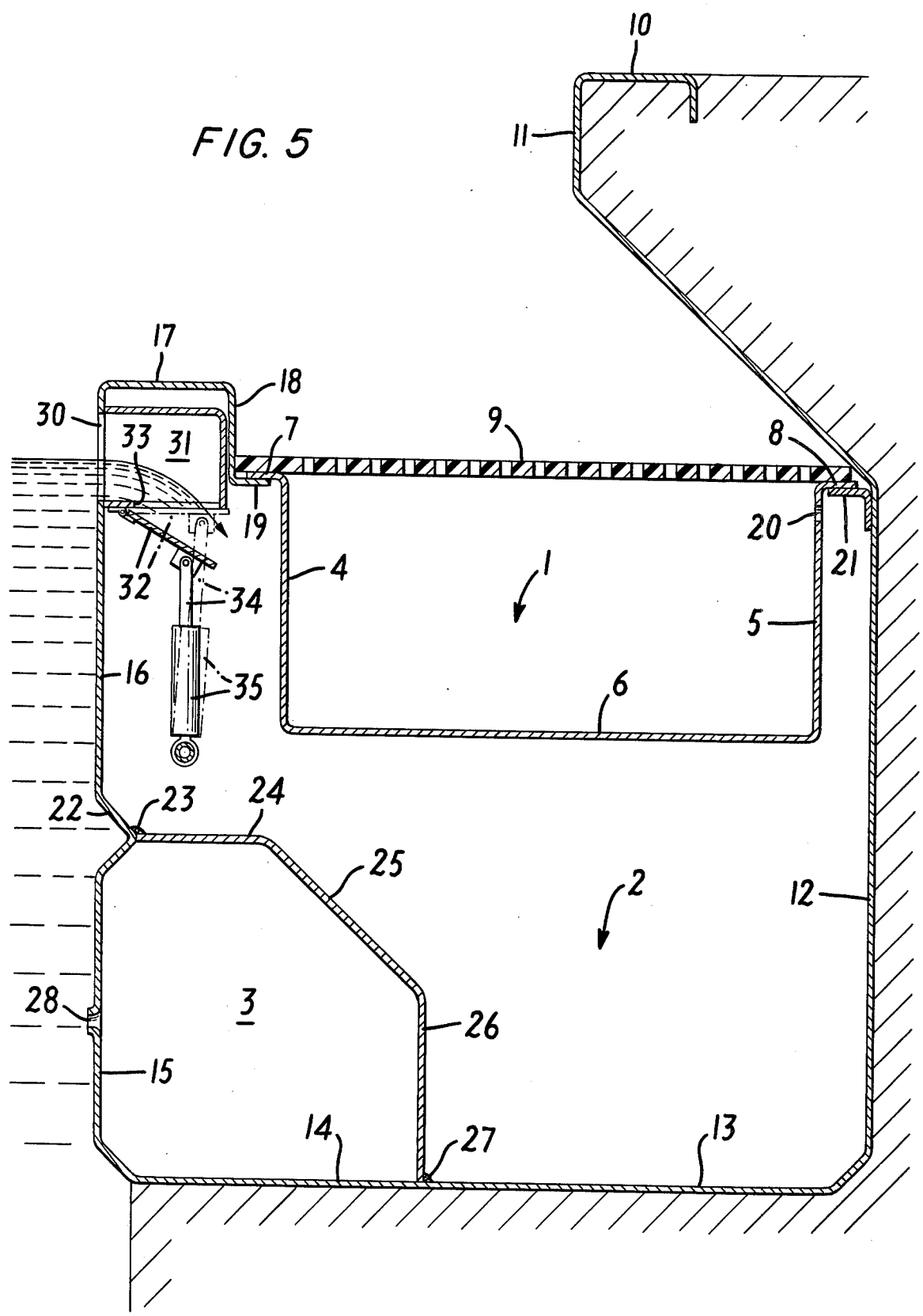
FIG. 5 represents a cross-sectional view through the gutter system shown in FIG. 4, taken along the line 5—5.

The liquid p in leg b in this particular instance is water, because this device is inserted as seen in FIGS. 3 to 5 to tap the water circulation system of a swimming pool, in the gutter. It can be inserted in any of the systems shown in FIGS. 3 to 13, as will presently be seen. The line connection d leads to the swimming pool water circulation system, joining it in the gutter as shown in FIG. 3.

It will now be apparent that according to the pressure of liquid p in the second leg b, the body of mercury m and in turn the body of mineral oil o will either rise or fall in the space s of the variable capacitor c, and in so doing changes the capacitance. The mineral oil can completely fill the space s or only partially fill the space, according to the pressure of liquid p on the bodies of mercury and mineral oil from the second leg b. As the level of mineral oil in the space rises, the capacitance of the capacitor decreases, and this effect is in turn reflected in a response in the electrical circuit, which will now be described.

Figure 2:
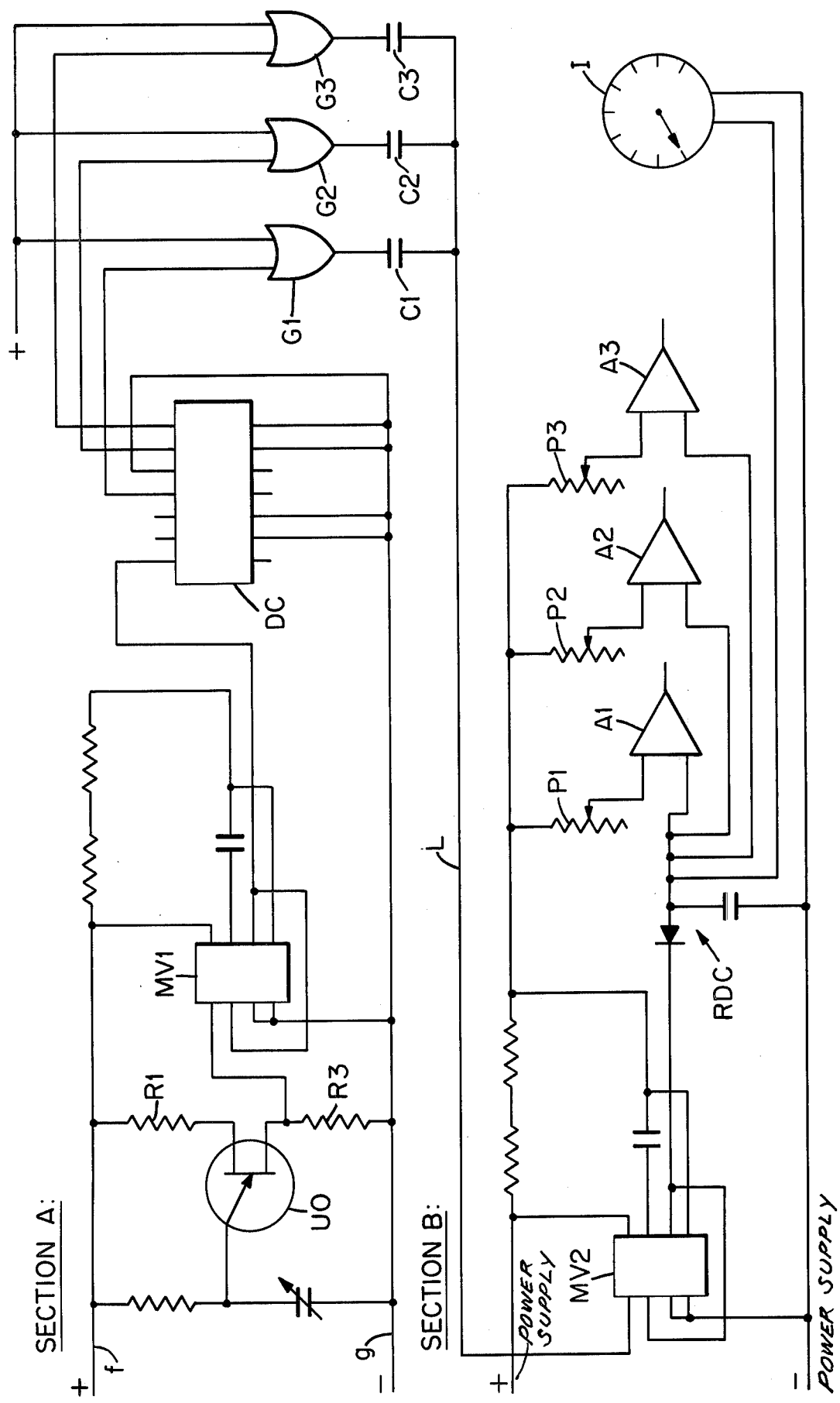
FIG. 2 is a wiring diagram showing the electric circuit operatively connecting the variable capacitor of FIG. 1, with level control and/or level indicating systems, showing how one can read off the liquid level directly and/or adjust the liquid level automatically, as required for example, in the water circulation system of FIGS. 3 to 5.

The electrical circuit shown in FIG. 2 is divided into two sections A and B, the A section representing the head circuit and the B section representing the read-out or operating circuit. The head circuit charges and discharges the capacitor c in the U-tube. As the capacitance at any given moment is related to the level of the body of water being sensed, the capacitance in the head circuit, because it is reflected in a corresponding reaction in the read-out circuit, makes it possible to literally read off the change in level on a scale I for example, and also to induce a response so as to modify the level and restore it to a predetermined norm. The change in capacitance is measured as a change in frequency in the head circuit.

The head circuit includes a unijunction transistor oscillator UO which is in electric connection via line f with the aluminum rod electrode e and via line g with the copper tube electrode a of the capacitor c as seen in FIG. 1. The unijunction transistor oscillator is arranged to charge the capacitor c through the resistance R1 until the capacitor is charged, and the unijunction transistor conduction voltage is reached. The variable capacitor then discharges through the unijunction transistor oscillator and resistance R3 to give a pulse. The frequency of this pulse is determined by the value of the U-tube capacitor c. The head circuit also includes a monostable multivibrator MV1 in electric connection with the unijunction transistor oscillator UO. This converts the pulses coming from the unijunction transistor oscillator (which are in a saw tooth form) into square waves. Each time the unijunction transistor oscillator pulses, a square wave is formed by the monostable multivibrator, and this leaves the monostable multivibrator as a series of square waves, totally synchronized with the frequency of the discharging and charging of the U-tube capacitor.

In electric connection with the monostable multivibrator is a decade counter DC. This receives and counts the square wave pulses from the monostable multivibrator MV1, and thereby distinguishes water levels sensed via line d which give different length pulses in proportion to pressure as reflected in capacitance.

In connection with the decade counter are three gates G1, G2 and G3. The decade counter sends a pulse to gate G1 when 1000 pulses have been counted. When 2000 pulses have been counted, a pulse is sent to gate G2. When 3000 pulses have been counted, a pulse is sent to gate G3. Additional gates can be added to count 4000 and more pulses. As these gates individually receive pulses they charge and discharge their respective fixed condensors C1, C2, C3, all of which feed pulses into the same line L, so that in effect a continuous series of pulses is sent from one or the other of these gates in the form of a saw tooth wave, and this is sent on to the read-out circuit B via line L.

The read-out circuit B includes a monostable multivibrator MV2 which converts the saw tooth wave form to a square wave. The multivibrator MV2 is in connection with a rectifying diode capacitor RDC combination of conventional type, producing a steady DC voltage, the level of which depends entirely on the amount of charge given the condensors C1, C2, C3, by the gates G1, G2, G3. This is turn is a function of the time allowed to charge the condensors through the gates, which in turn is a function of the time taken to count 1000, 2000 and 3000 pulses, respectively.

These counts are entirely dependent upon the frequency of the wave form sent from the monostable multivibrator MV1, which in turn derives its form from the unijunction transistor oscillator UO, which in turn is controlled by the variable capacitor $c$ of the U-tube shown in FIG. 1. This is a reflection of the dielectric mineral oil level in the capacitor $c$ which in turn depends on pressure of liquid in the second leg $b$ of the tube. Hence, the entire system is in effect controlled by the rise and fall of the mineral or dielectric oil in the first leg of the U-tube, which is a direct function of water level in the liquid, such as a body of swimming pool water whose level is to be controlled. The DC voltage derived from the rectifying diode capacitor RDC combination will also be controlled by the rise and fall of the mineral or dielectric oil in the first leg of the U-tube.

The several components of the read-out circuit B requiring power operation are connected to a power supply at the + and − terminals, as indicated in the Figure.

The steady DC voltage can be used to control the equipment required to respond to changes in water level in the system. For each particular piece of equipment to be controlled in the pool recirculation system, an operational amplifier, such A1, A2, A3, is provided in the read-out circuit. These amplifiers are arranged to receive the varying DC voltage from the rectifying diode capacitor RDC combination, which is controlled by the rise and fall of the dielectric oil in the first leg of the U-tube. Connected to these operational amplifiers are potentiometers, P1, P2, P3 (or as many as are required) and an independent source of voltage is provided to these potentiometers. By adjusting these potentiometers, a "comparitor" voltage is supplied to the amplifiers such that if the line voltage from the system achieves a voltage that is similar to, or diverts from, the input voltage to the operational amplifiers as provided by the potentiometers, the amplifiers will operate and provide a signal to operate relays to control; for example, hydraulic, mechanical or solenoid valves, which open and close, to stop or start water flow in selected stages of the system.

The read-out circuit also includes an indicator I which makes it possible to read off water level directly from a scale. The indicator I is in electric connection with the rectifying diode capacitor combination to receive DC voltage, and by appropriate calibration accurately and continuously reads the level of water in the body of water connected to the second leg $b$ of the U-tube shown in FIG. 1.

The water circulation system shown in FIGS. 3 to 5 includes the liquid level sensing device of FIG. 1 and the electric circuit of FIG. 2 to control water circulation in a gutter of a swimming pool.

The U-tube shown in FIGS. 3 to 5, indicated as 75, is arranged with the line connection $d$ leading off the gutter 2 at the periphery of the swimming pool. The line $d$ senses water pressure and therefore the level of water in the gutter 2 via the pressure on the mercury $m$ in the legs $a$, $b$ of the U-tube, and thereby the level of the dielectric liquid in space $s$, which in turn is reflected in a corresponding capacitance for that level in the variable capacitor $c$ of the U-tube.

The pool perimeter gutter shown in FIGS. 3 to 5 is made in a plurality of modular units, which are fitted together on-site and bonded together by welding, soldering or brazing in the number required to form the perimeter rim of a swimming pool. A sheet of stainless steel or other corrosion-resistant metal or plastic material is formed in the configuration shown, with a top coping 10, a gutter back wall 11, bent forward towards the pool in a manner to partially cover over a first gutter 1, and then continuing to form the back wall 12 and bottom wall 13 of a second gutter 2, the bottom wall 14 and pool perimeter side wall 15 of a water feed conduit 3, the pool perimeter side wall 16 of the second gutter 2, and the top wall 17 of the second gutter 2, which also serves as the top rim of the swimming pool, over which water may flow into the first gutter 1. The stainless steel sheet terminates in a flange 19, which serves as a ledge support for one side of the first gutter 1. A second flange 21 is attached by welding or brazing to the back wall 12 of the second gutter 2, to serve as the other ledge support for the first gutter 1.

The first gutter 1 is made of another sheet of stainless steel, formed in a U-configuration, with sides 4, 5, and bottom 6, terminating in flanges 7, 8 supporting the gutter on flanges 19, 21 of the first sheet. A grille 9 rests on flanges 7, 8, and covers over the open top of the first gutter, so as to prevent bathers from stepping into it, with possibly injurious consequences. The grille of course can be omitted.

In the side wall 5 of the first gutter, there is one or several openings 20 in the form of long narrow slots providing fluid flow communication with the second gutter 2 at the top of the gutter 1. These openings define the maximum water level in the first gutter, since water above this level automatically flows through the openings 20 into the second gutter. The openings are sufficiently numerous and large to accommodate such flow, thus preventing flooding of the first gutter.

Through the pool perimeter side wall 16 of the second gutter are a number of narrow, long openings 30, approximately ½ inch below the top of the top of the gutter. These openings lead to weir passages 31, which accommodate skimming flow from the pool, and feed directly into the second gutter 2. Thus, skimming flow is separated from surge flow across the top 17 of the perimeter gutter, which feeds directly into the first gutter 1. Flaps 32 are provided across the openings 33 at the inner ends of the passages. These flaps on their undersides are pivotably mounted on the pistons 34, which are operated hydraulically in cylinders 35. The flaps can be lowered to the open position, shown in FIGS. 3 and 4, by drawing in the piston, on the suction stroke, or pivoted to the dashed-line position shown in FIG. 4, to close off the weir passages 31, by pushing out the piston, on the power stroke. The opening and closing of the flaps can be effected by any kind of mechanism, however.

The pool perimeter walls 16 of the second gutter 2 and 15 of the water feed conduit 3 meet in a V-notch 22. At the base 23 of the V a third sheet of stainless steel is welded, and formed so as to extend inwardly and down to define the other sidewalls 24, 25, 26 of the water feed conduit 3, and is welded to the bottom 13 of the second gutter conduit 2 at 27.

A plurality of openings 28 are provided in the pool perimeter wall 15 of the water feed conduit 3, for feed of recirculating clean water to the pool. These openings can, if desired, be provided with nozzles or jets, in known manner, directing flow horizontally or downwardly into the pool.

There is a direct line connection 40 leading from the second gutter 2 and the first gutter 1 to the recirculation system 50, and there is also a main drain 41 in the bottom 42 of the swimming pool leading via main drain line 44 to the recirculation system. There is a main drain throttling valve 43 in the main drain line 44, so that this line can be closed off, or partially or fully opened, and there is also a gutter overflow valve 45 in the gutter line 40, so that this can be closed off. On the downstream side of the filter 51 in the water purifying system there is a recirculation flow throttling valve 46, which controls recirculation flow through the return feed line 52 leading to the water feed inlet 53 in the conduit 3. The valve 46 also can be partially or fully opened, or closed, increasing the recirculating flow or decreasing it, as may be required. The pump 54 maintains circulation of water through the filter 51 and return feed line 52 to the conduit 3.

There is also a make-up water valve 47 in fluid flow connection via a line 48 to the fillspout 49 on the deck of the pool, permitting introduction of fresh water from the water supply, such as, for example, the water main supply at the pool location.

The water level sensing device 75 detects different water levels in the second gutter 2, via line $d$.

When pool level is below the bottom of the surge weir openings 30, there is no skimming flow, and the water level in the pool perimeter gutter sinks to level L1. This level is sensed by the device 75 and results in an electric signal via gates G1, G2 and G3, condensers C1, C2 and C3 to operational amplifier A1, which responds by opening the make-up water valve 47, so that water is admitted from the feed line 55 into the line 48, and thence to the pool at fillspout 49.

When the pool is full, since the surge weir flaps 32 are open, in the position shown in FIGS. 3, 4, and 5, skimming flow takes place at a predetermined level through the weirs, and the gutter water level rises to level N. The sensing device 75 senses this higher level, and gives an electric signal via gates G1, G2, and G3, condensers C1, C2, and C3 to operational amplifier A2, and this turns off make-up water valve 47, and cuts off feed of fresh water to the pool.

Next, the sensor 75 senses a second and higher gutter water level L2, corresponding to the increased surge weir flow under light pool activity. When the water level reaches L2 because there is too much flow through the weirs, it is necessary to close the surge weirs, to prevent excessive gutter flow. The sensor responds to this condition by giving an electric signal via gates G1, G2, and G3, condensors C1, C2, and C3 to operational amplifier A3, actuating the cylinder 35 and pushing out the piston 34, closing the flaps 32, and closing off the weirs. In this condition, some surge flow cascades over the top 17 of the perimeter gutter into gutter 1, but gutter 1 has adequate capacity to accommodate such flow.

A further increase in pool activity will lead to an increased flow of water across the top 17 of the perimeter gutter into the first gutter 1. Under medium pool activity, the flow fills the gutter 1, whereupon the excess spills over into the second gutter 2, through the passages 20. This increases the water level in the second gutter, to the level L3, and increases the burden on the water recirculation system, which requires adjustment to accommodate the increased gutter flow.

Accordingly, sensor 75 this time gives an electric signal via gates G1, G2, and G3, condensers C1, C2 and C3, to operational amplifier A4, which sends a signal and closes the main drain valve, thus making it possible for the recirculation system 50 to accommodate the increased gutter overflow in line 40, the flow through which is now equal to that formerly reaching the recirculation system 50 from the combined volumes of the flows in the main drain line 44 and gutter overflow line 40.

Increased pool activity to the maximum activity level further increases the amount of water cascading across the top 17 of the perimeter gutter into gutter 1, and thence through the overflow openings 20 into gutter 2, with the result that the level in gutter 2 rises to level L4. The sensing device 75 now sends a signal via gates G1, G2, and G3, condensers C1, C2 and C3, to operational amplifier A5, which opens the recirculation flow throttling valve 46, increasing the rate (and therefore the volume amount) of recirculation flow through the recirculation system 50, so as to accommodate the increased flow through the gutters. This is so designed as to accommodate any maximum flow that may be encountered during maximum activity in the pool.

It is apparent that instead of closing the main drain valve 43, an increased recirculation system capacity can also be achieved by opening the throttling valve 46. Thus, sensor 75 can be arranged to open valve 46 instead of closing valve 43.

It is thus apparent that the sensor system in accordance with the invention not only senses and responds to the water level in the pool, but also to water level in the second gutter, so as to respond to activity in the pool at any desired level, as reflected in higher gutter flow, and adjust the water recirculation system to accommodate it without gutter flooding or spill back into the pool.

The necessary gutter capacity to accommodate the increased gutter flow during periods of pool activity, whether low or intense, is provided by the second gutter, thus ensuring that at no time does water washed into the gutter return to the pool without having first passed through the pool cleansing and recirculation system via the filter. The response to three different levels of activity, low, moderate, and high, is fully automatic in all cases.

As pool activity decreases, and gradually returns to normal, the sensors are again actuated in the same order but in reverse sequence, so that the water recirculation system responds to the now decreased circulation through the gutters.

Thus, a decrease in the gutter level below level L4, sensed by sensor 75, results in a throttling back of recirculation flow throttling valve 46. When the level decreases further, to below the level L3, the main drain throttling valve 43 is again opened. Further decrease to level L2 leads to the actuation via sensor 75 of the piston arrangement to open the flaps 32 and thus reopen the surge weirs, and this condition is maintained as long as the pool is quiescent, at normal pool operating level, i.e., at gutter level N. If for some reason, as for example, through heavy use, the amount of water decreases, so that level L1 is reached, the sensor 75 opens the make-up valve 47, to restore the pool level to normal, and when the pool level is normal, the pool sensor 75 shuts off the valve 47, thus ensuring adequate skimming flow during periods of quiescence.

The water flow control system is consequently fully automatic, whether the flow to be accommodated is increasing or decreasing, and according to whether the activity in the pool is nil (quiescent), light, medium or heavy.

It will of course be appreciated that different degrees of activity intermediate these can be accommodated, by provision of additional circuitry, and additional positions of either the recirculation flow throttling valve, or the gutter overflow and main drain systems.

Figure 6:
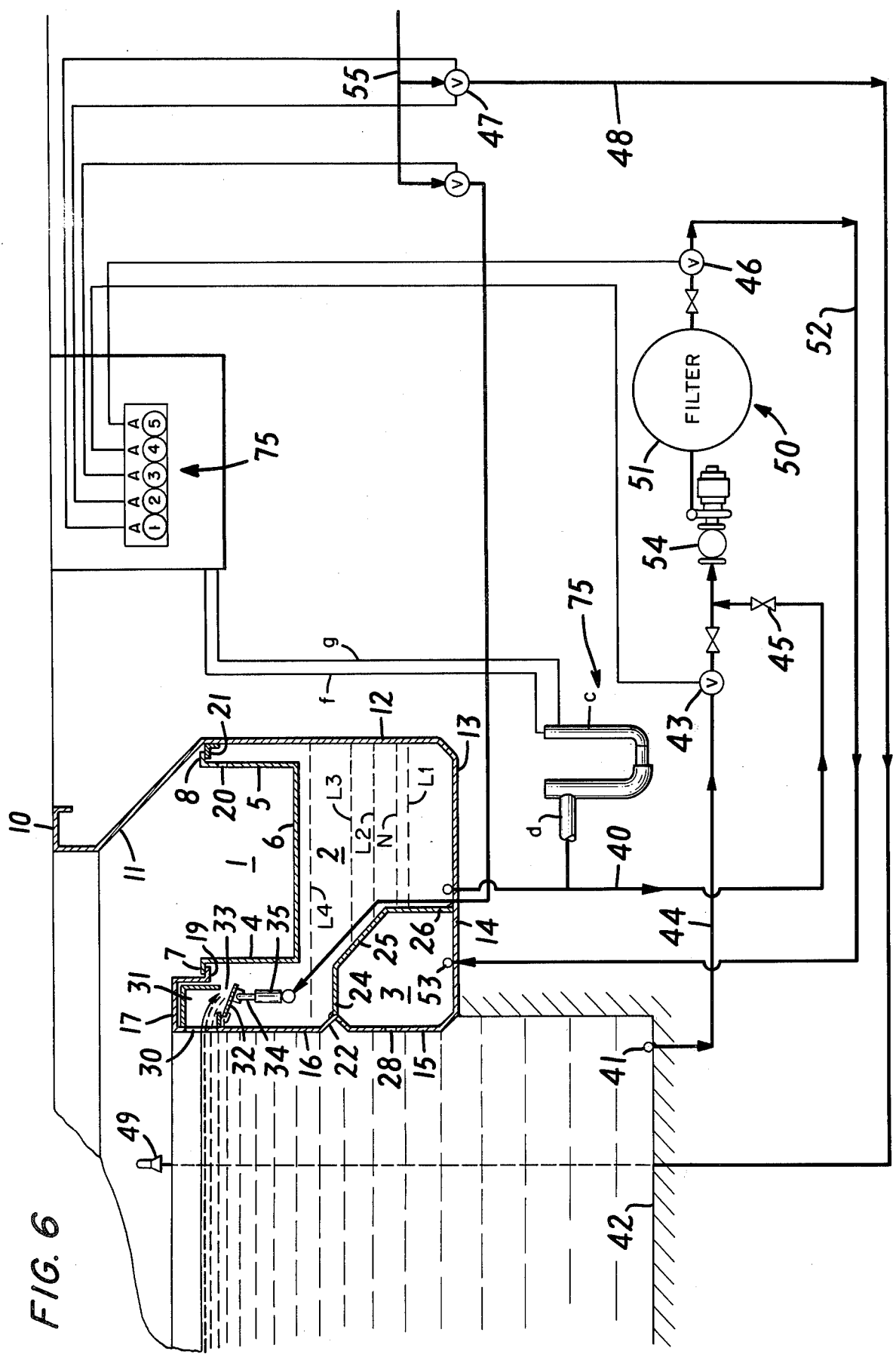
FIG. 6 is a pool water flow circuit diagram, similar to that of FIG. 3, but with the device sensing increase in overflow at a balance line.
Figure 7:
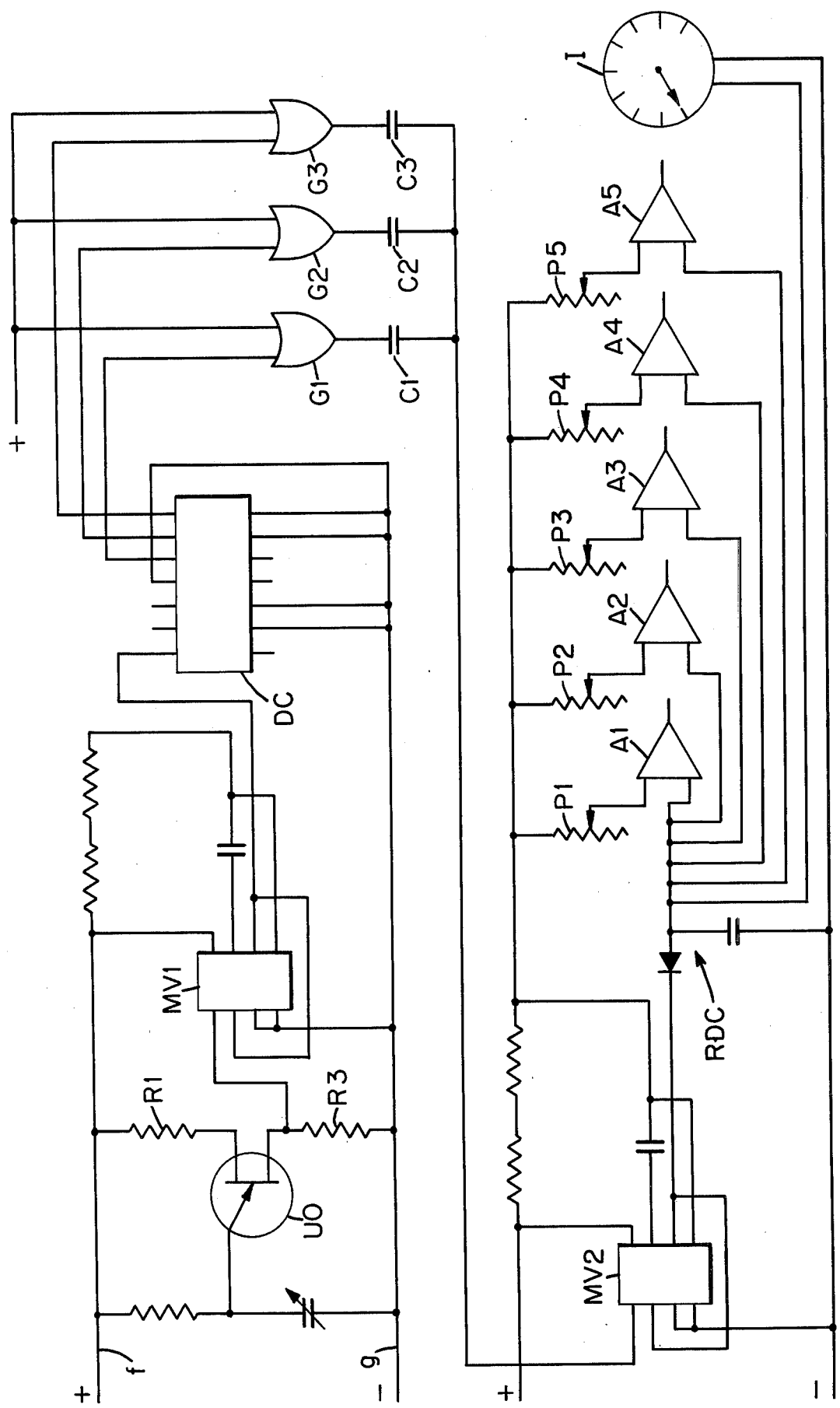
FIG. 7 is a wiring diagram for an electric circuit similar to that of FIG. 2, but for the water circulation system of FIG. 6.

A modified system is shown in FIGS. 6 and 7, with the sensor 75 responsive to pressure via line d in the balance line 40. In other respects, the system is similar to that of FIGS. 3 to 5.

The sensor 75 senses and responds to pressure in line 40 corresponding to a first level L1 of water in the second gutter 2, which is in turn related to the predetermined minimum level at which the pool water level is below skimming flow level at the lower rim of openings 30, and must be replenished. The sensor upon detecting such a low level responds by opening the make-up water valve 47, so that water is admitted from the feed line 55 into the line 48, and thence to the pool at fillspout 49.

When the pool is full, since the surge weir flaps 32 are open, in the position shown in FIGS. 3, 4, and 5, skimming flow takes place at a predetermined level through the weirs, and the gutter water level rises to level N. The sensing device 75 senses this higher level, and gives an electric signal via gates G1, G2, and G3, condensers C1, C2, and C3 to operational amplifier A2, and this turns off make-up water valve 47, and cuts off feed of fresh water to the pool.

The sensor 75 then senses a second and higher pressure in line 40 corresponding to water level L2 in the second gutter, which is above the normal operating level (represented by gutter level N, with the pool quiescent, the surge weir passages 31 open, and normal skimming flow provided through the surge weir passages via openings 33 into the second gutter), and corresponding to the increased surge weir flow under light pool activity. When the water level reaches level L2, there is too much flow through the weirs, and it is necessary to close the surge weirs, to prevent excessive gutter flow. The sensor responds to this condition by actuating the cylinder and pushing out the piston, closing the flaps 32, and closing off the weirs.

In this condition, some surge flow cascades over the top 17 of the perimeter gutter into gutter 1, but gutter 1 has adequate capacity to accommodate such flow.

A further increase in pool activity will lead to an increased flow of water across the top 17 of the perimeter gutter into the first gutter 1. Under medium pool activity, the flow fills the gutter 1, whereupon the excess spills over into the second gutter 2, through the passages 20. This increases the water level in the second gutter to the level L3, and increases the burden on the water recirculation system, which requires adjustment to accommodate the increased gutter flow.

Accordingly, the sensor 75, responsive to the higher pressure in balance line 40, is in actuating connection with the main drain throttling valve 43, and closes the main drain valve, thus making it possible for the recirculation system 50 to accommodate the increased gutter overflow in line 40, the flow through which is now equal to that formerly reaching the recirculation system 50 from the combined volumes of the flows in the main drain line 44 and gutter overflow line 40.

Increased pool activity to the maximum activity level further increases the amount of water cascading across the top 17 of the perimeter gutter into gutter 1, and thence through the overflow openings 20 into the gutter 2, with the result that the level in gutter 2 rises to level L4. The sensor 75 responds to the higher pressure in balance line 40 and opens the recirculation flow throttling valve 46 to the next higher open position, further increasing the rate (and therefore the total volume amount) of recirculation flow through the recirculation system 50, so as to accommodate the increased flow through the gutters. This is so designed as to accommodate any maximum activity in the pool.

As pool activity decreases, and gradually returns to normal, the sensor is actuated in reverse sequence, so that the water recirculation system responds to the now decreased circulation through the gutters.

Thus, a decrease in the gutter level from L4 is sensed by the sensor 75, which thereupon throttles back recirculation flow throttling valve 46 to accommodate normal flow. When the gutter level decreases further, to below the level L3, the sensor 75 opens the main drain throttling valve 43. Further decrease to level L2 leads to the actuation via sensor 75 of the piston arrangement to open the flaps 32, and thus reopen the surge weirs, and this condition is maintained so long as the pool is quiescent, at normal pool operating level, reflected in gutter level N. If for some reason, as for example, through evaporation, the amount of water decreases, so that level L1 is reached, the sensor 75 opens the make-up valve 47, to restore the pool level to normal, whereupon sensor 75 shuts off the valve 47, thus ensuring adequate skimming flow during periods of quiescence.

The pool level and skimming gutter control system of FIGS. 3 to 7 is a water recirculating system which is controlled automatically by the swimming load. The most desirable of the various possible operating modes is selected automatically by the control system, dynamically guided by the amount of people in the pool, and their activity.

During quiescence (no persons in the pool) surface cleaning takes place through open surge weirs. As swimmers enter the pool causing displacement surge and waves, these weirs will automatically and positively close. As activity continues to increase, the main drain will close requiring all water from the swimming pool to be drawn from the perimeter overflow system channels. As the number of swimmers increases and the activity level increases, the recirculation (turnover) rate will automatically increase, improving the quality of filtration. As the bathers leave the pool, the recirculating rate will return to normal, and the main drain and surge weirs will open at predetermined levels, as the pool returns to its quiescent state. If after reaching quiescence the designed rate of surface cleaning is not being maintained, water will automatically be added to the swimming pool until this rate is achieved.

Functionally, the lower of the two gutters, the second gutter, accepts water through the surge weirs during quiescence, and continues to accept water until it reaches a predetermined level. At this level, the surge weirs automatically close, requiring all water to enter the first gutter of the perimeter overflow system by passing over the perimeter overflow system lip into the upper gutter. Water may flow from the upper first gutter directly to the filtration system, or it may pass through surge control ports into the lower second gutter. As the pool activity and number of swimmers decrease, the upper gutter will drain, the system will return to its normal recirculating rate, and the surge weirs will open.

The system thus responds automatically to user-activated dynamic demand, to determine the operating mode, continuously and automatically for the life of the swimming pool:

1. Maintains the water level

2. Sets the proper surface cleaning (skimming) flow rate

3. Senses whether the surge weirs should be open or closed

4. Determines whether the main drain should be partially open or closed.

5. Increases the recirculating rate as required due to heavy loading.

In addition to dynamic sensing of the above, this system can be designed to provide surge containment capacity and flow rates for up to 3000 gallons per minute. It offers completely uniform distribution of clean water to the pool; it provides a safety handhold, and it can be supplied with a grating, if this be thought to be desirable.

Due to the increased recirculation rate under heavy loading, the system has the further advantage of improving the pool surface conditions for competition. The higher gutter flow transfer over the perimeter-rim combined with heavier clean water feed has a wavequelling effect, reducing turbulence. If the clean water feed is directed downwardly, there is created an upflow in the central portion of the pool, drawn off at the perimeter, further reducing wave rebound at the perimeter.

Figure 8:
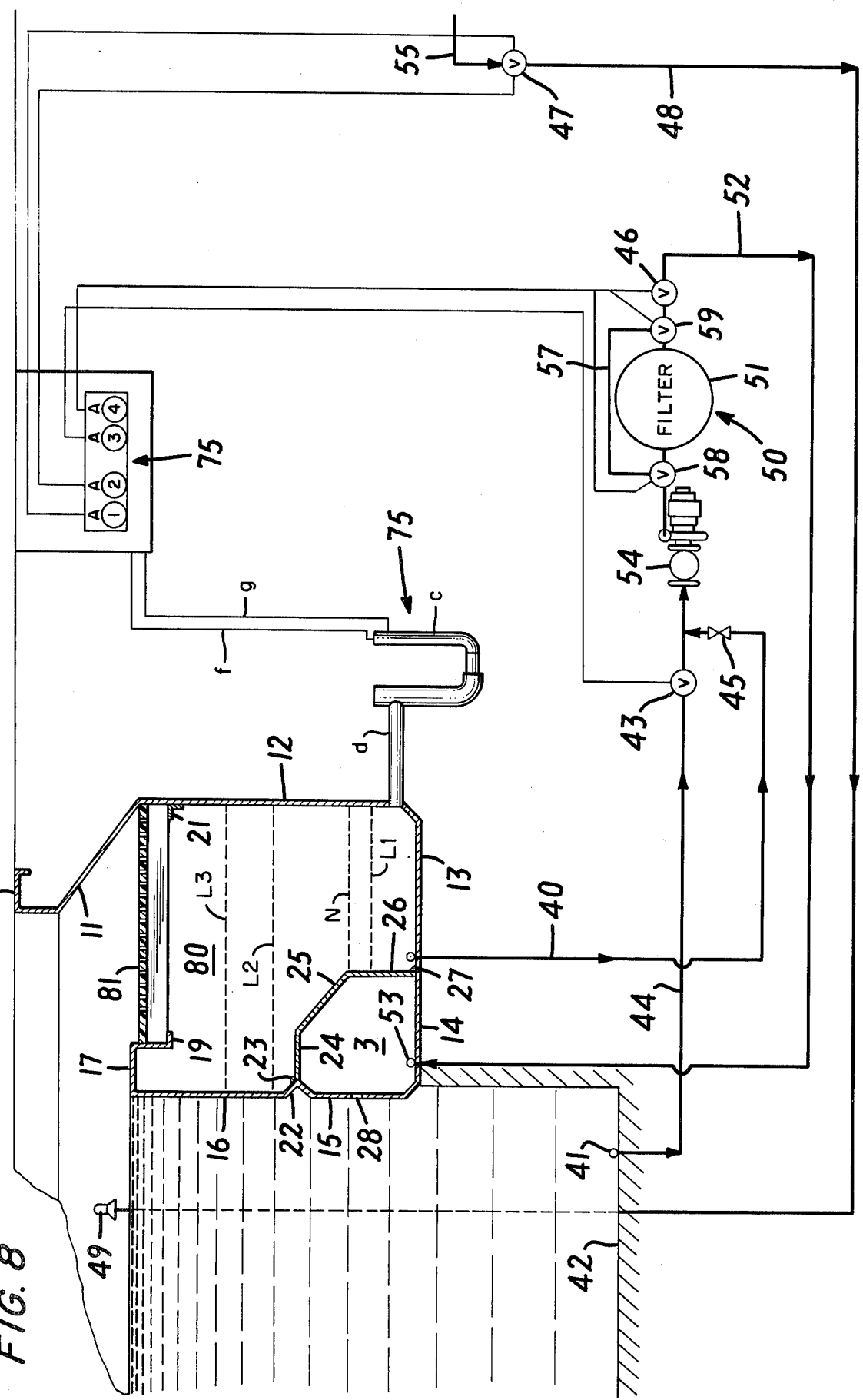
FIG. 8 is a pool water flow circuit diagram showing a single-gutter pool perimeter water recirculation system with the automated control system of the invention imposed thereon.
Figure 9:
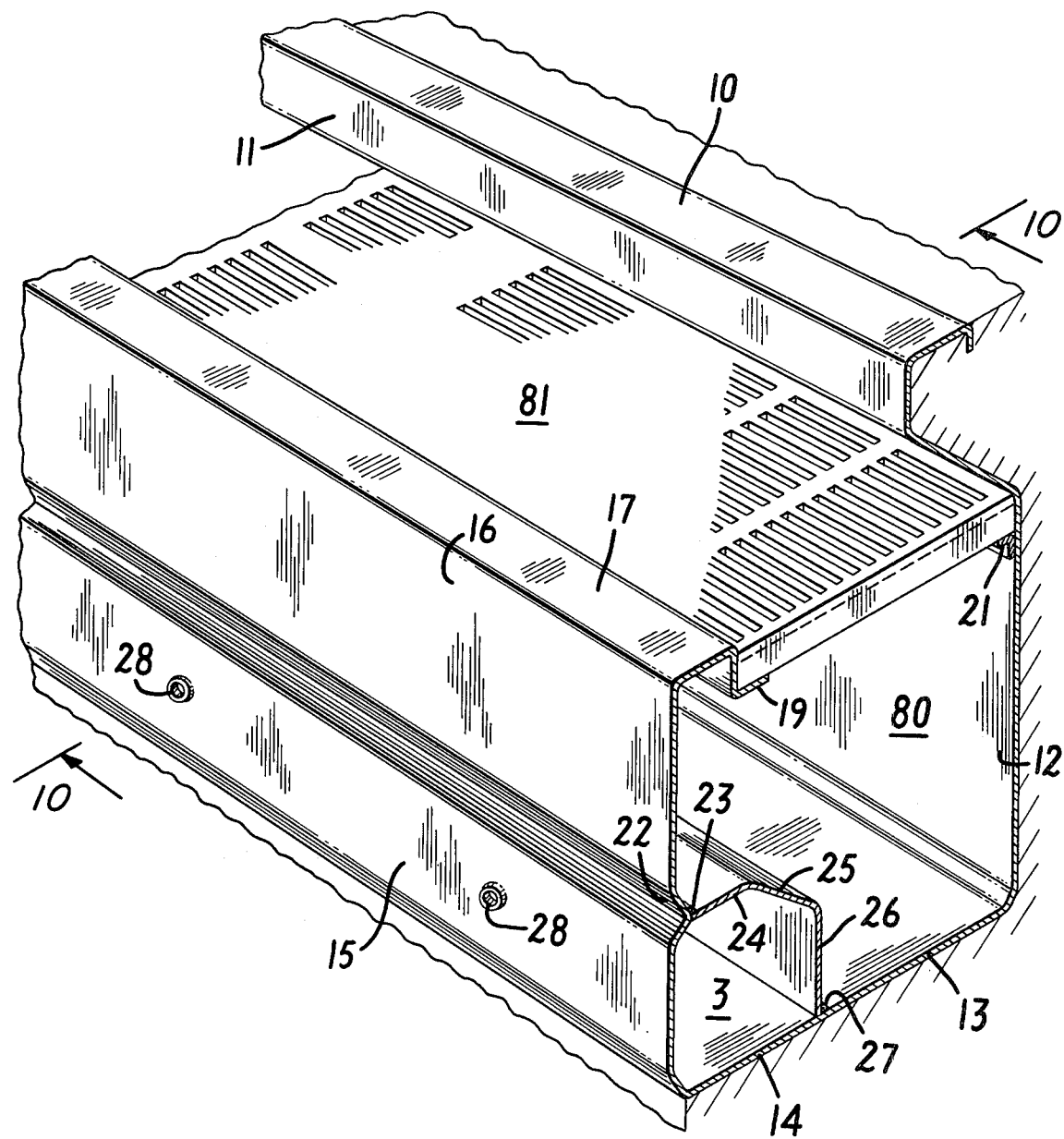
FIG. 9 represents a view of one modular unit of the single-gutter pool perimeter gutter of FIG. 8.
Figure 10:
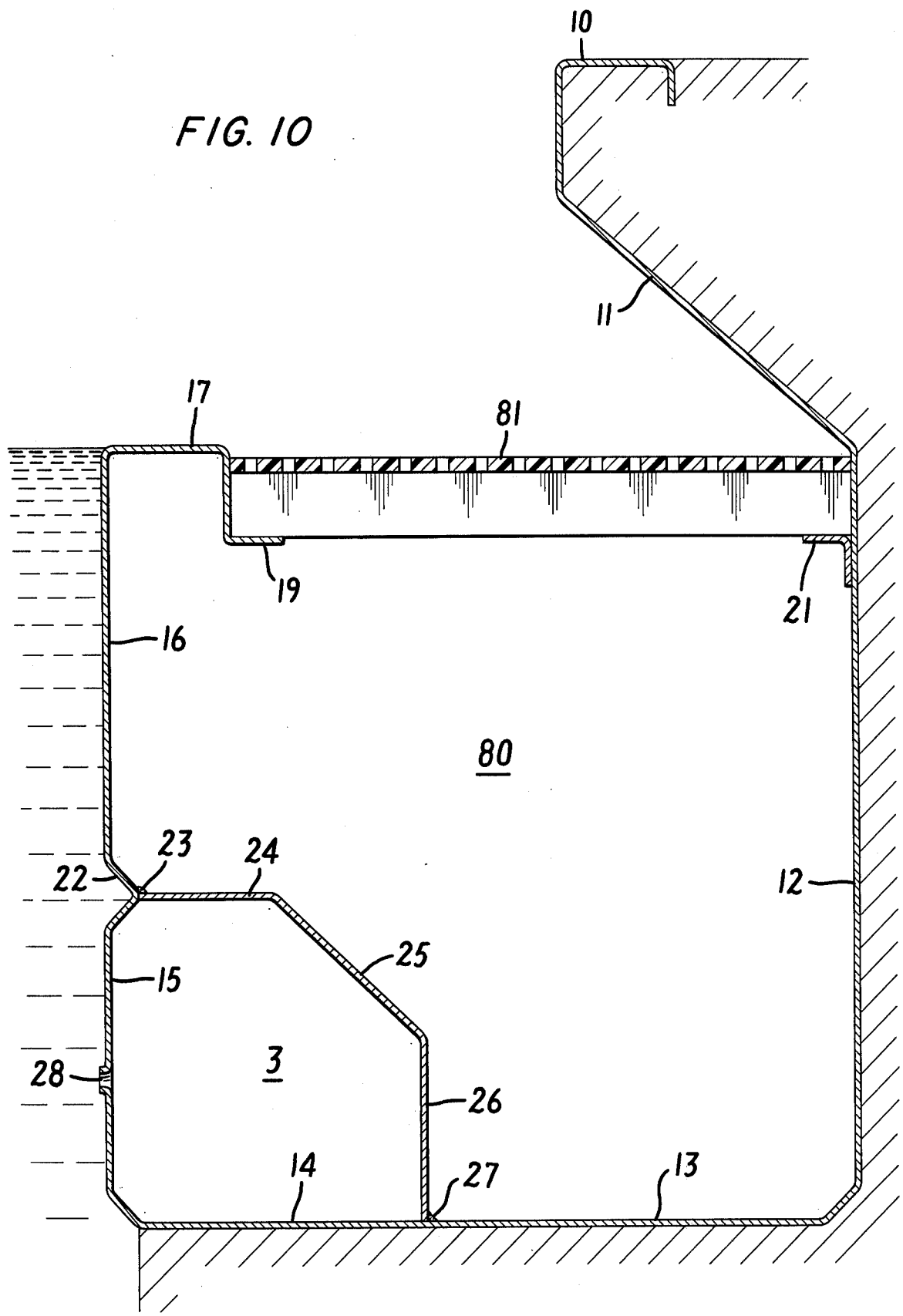
FIG. 10 represents a cross-sectional view through the gutter system shown in FIG. 9, taken along the line 10—10.
Figure 11:
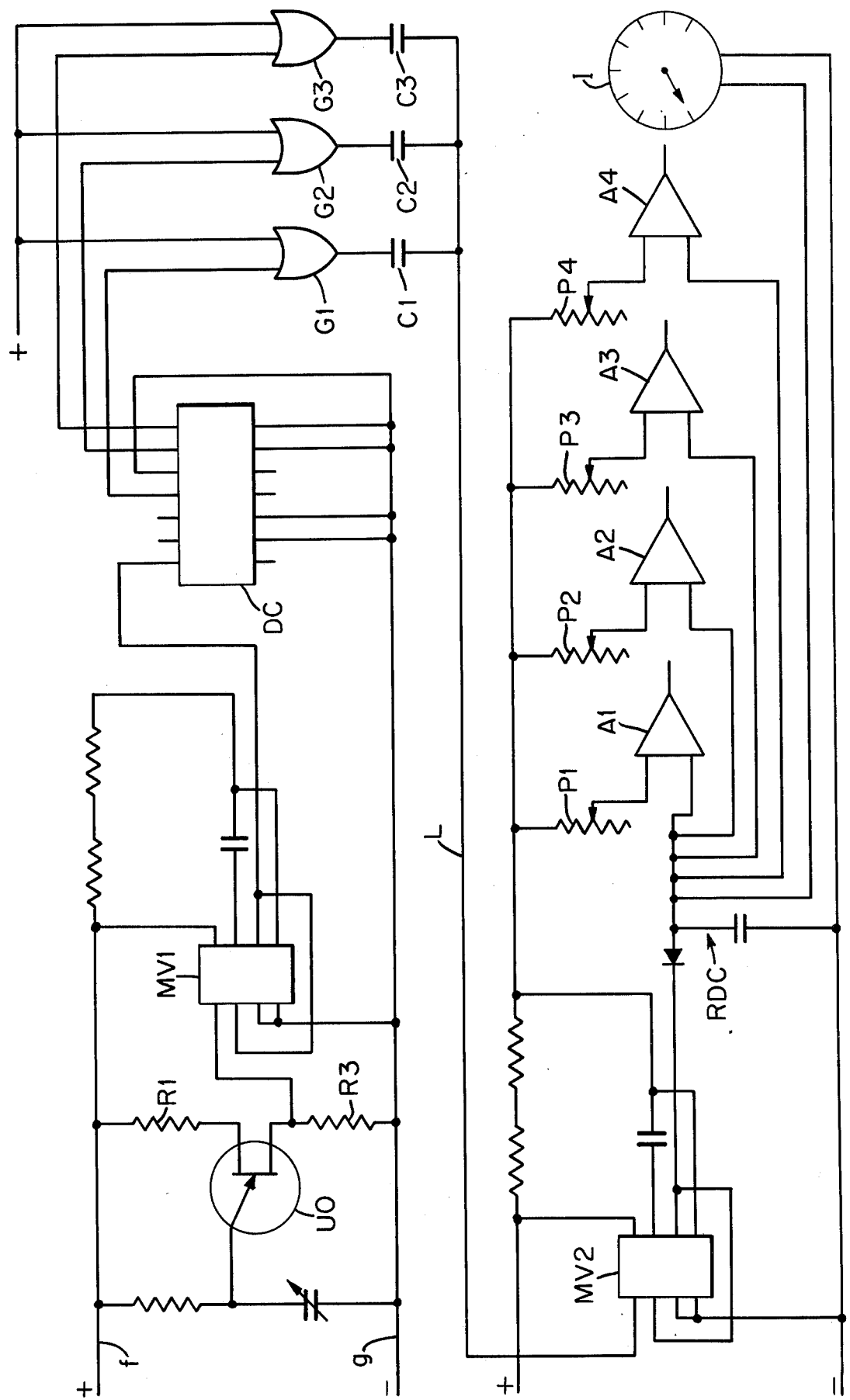
FIG. 11 is a wiring diagram showing an electric circuit for the water circulation system of FIGS. 8 to 10.

The large capacity single-gutter pool perimeter gutter shown in FIGS. 8 to 10 is made in a plurality of modular units, which are fitted together on-site and bonded together by welding, soldering or brazing in the number required to form the perimeter rim of a swimming pool. A sheet of stainless steel or other corrosion-resistant metal or plastic material is formed in the configuration shown, with a top coping 10, a gutter back wall 11, bent forward towards the pool in a manner to partially cover over the gutter 80, and then continuing to form the back wall 12 and bottom wall 13 of the gutter 80, the bottom wall 14 and pool perimeter side wall 15 of a water feed conduit 3, the pool perimeter side wall 16 of the gutter 80, and the top wall 17 of the gutter 80, which also serves as the top rim of the swimming pool, over which water may flow into the gutter 80. The stainless steel sheet terminates in a flange 19, which serves as a ledge support for one side of the grating 81 over the gutter 80. A second flange 21 is attached by welding or brazing to the back wall 12 of the gutter 80, to serve as the other ledge support for the grating 81. The grating covers over the open top of the gutter, so as to prevent bathers from stepping into it, with possibly injurious consequences.

The top wall 17 of the gutter defines the maximum water level in the pool, and serves as a skimming weir, since water above this level automatically flows over the top 17, through the grating 81 into the gutter 80. The gutter 80 is of a large enough capacity to accommodate all such flow, without flooding.

The pool perimeter walls 16 of the gutter 80 and 15 of the water feed conduit 3 meet in a V-notch 22. At the base 23 of the V a second sheet of stainless steel is welded, and formed so as to extend inwardly and down to define the other sidewalls 24, 25, 26 of the water feed conduit 3, and is welded to the bottom 13 of the gutter conduit 80 at 27.

A plurality of openings 28 are provided in the pool perimeter wall 15 of the water feed conduit 3, for feed of recirculating clean water to the pool. These openings can, if desired, be provided with nozzles or jets, in known manner, directing water flow horizontally or downwardly into the pool.

There is a direct line connection 40 leading from the gutter 80 to the recirculation system 50, and there is also a main drain 41 in the bottom 42 of the swimming pool, leading via the main drain line 44 to the recirculation system. There is a main drain throttling valve 43 in the main drain line 44, so that this line can be closed off, or partially or fully opened, and there is also a gutter valve 45 in the gutter line 40, so that this can be closed off. On the downstream side of the filter 51 in the water purifying system there is a recirculation flow throttling valve 46, which controls recirculation flow through the return feed line 52 leading to the water feed inlet 53 in the conduit 3. The valve 46 also can be partially or fully opened, or closed, increasing the recirculating flow or decreasing it, as may be required. The pump 54 maintains circulation of water through the filter 51 and return feed line 52 to the conduit 3.

There is also a make-up water valve 47 in fluid flow connection via a line 48 to the fillspout 49 on the deck of the pool, permitting introduction of fresh water from the water supply, such as, for example, the water main supply at the pool location.

The water level sensing system 75, best seen in FIG. 8, is composed of a sensor 75 of the invention detecting three different water levels in the gutter 80.

The sensor 75 senses and responds to a first level L1 of water in the gutter 80 corresponding to the minimum pool level at which the pool water level is below the predetermined skimming flow level above the top 17 of the gutter 80, and must be replenished. This sensor upon detecting such a low level responds by opening the make-up water valve 47, so that water is admitted from the feed line 55 into the line 48, and thence to the top of the pool at fillspout 49.

When the pool is full, since the surge weir flaps 32 are open, in the position shown in FIGS. 3, 4, and 5, skimming flow takes place at a predetermined level through the weirs, and the gutter water level rises to level N. The sensing device 75 senses this higher level, and gives an electric signal via gates G1, G2, and G3, condensers C1, C2, and C3 to operational amplifier A2, and this turns off make-up water valve 47, and cuts off feed of fresh water to the pool.

An increase in pool activity will lead to an increased flow of water across the top 17 of the perimeter gutter into the gutter 80. Under medium pool activity, the flow increases the water level in the gutter 80 to above the normal operating level N to the level L2, sensed by the sensor 75, and increases the burden on the water recirculation system, which requires adjustment to accommodate the increased gutter flow.

Accordingly, the sensor 75 is in actuating connection with the main drain throttling valve 43, and closes the main drain valve, thus making it possible for the recirculation system 50 to accommodate the increased gutter overflow in line 40, the flow through which is now equal to that formerly reaching the recirculation system 50 from the combined volumes of the flows in the main drain line 44 and gutter overflow line 40.

Increased pool activity to the maximum activity level further increases the amount of water cascading across the top 17 of the perimeter gutter into the gutter 80, with the result that the level in the gutter rises still higher, to level L3, sensed by the sensor 75. The sensor thereupon opens the valves 58, 59, permitting flow in line 57, bypassing the filter 51, and opens the recirculation flow throttling valve 46, increasing the rate (and therefore the volume amount) of recirculation flow through the recirculation system 50, so as to accommodate the increased flow through the gutter. This is so designed as to accommodate any maximum gutter flow that may be encountered during maximum activity in the pool.

As pool activity decreases, and gradually returns to normal, the sensors are again actuated, in the same order but in reverse sequence, so that the water recirculaton system responds to the now decreased circulation through the gutters.

Thus a decrease in the gutter level to below level L3, sensed by sensor 75, results in closing valves 58, 59 and thus bypass line 57 and a throttling back of recirculation flow throttling valve 46. When the level decreases further, to below level L2, sensed by sensor 75, the main drain throttling valve 43 is again opened. This condition is maintained so long as the pool is quiescent, and at normal pool operating level, reflected in gutter level N. If for some reason, as for example, through heavy use, the amount of water decreases, so that level L1 is reached, the sensor 75 opens the make-up valve 47, to restore the pool level to normal skimming flow level, whereupon pool sensor 75 shuts off the valve 47, thus ensuring adequate skimming flow during periods of quiescence.

The wate flow control system is consequently fully automatic, whether the flow to be accommodated is increasing or decreasing, and according to whether the activity in the pool is nil (quiescent), light, medium or heavy.

It will of course be appreciated that different degrees of activity intermediate these can be accommodated, by provision of additional gates, condensers, and operational amplifiers, as in FIGS. 3 to 7, and additional positions of either the recirculation flow throttling valve, or the gutter overflow and main drain systems.

Figure 12:
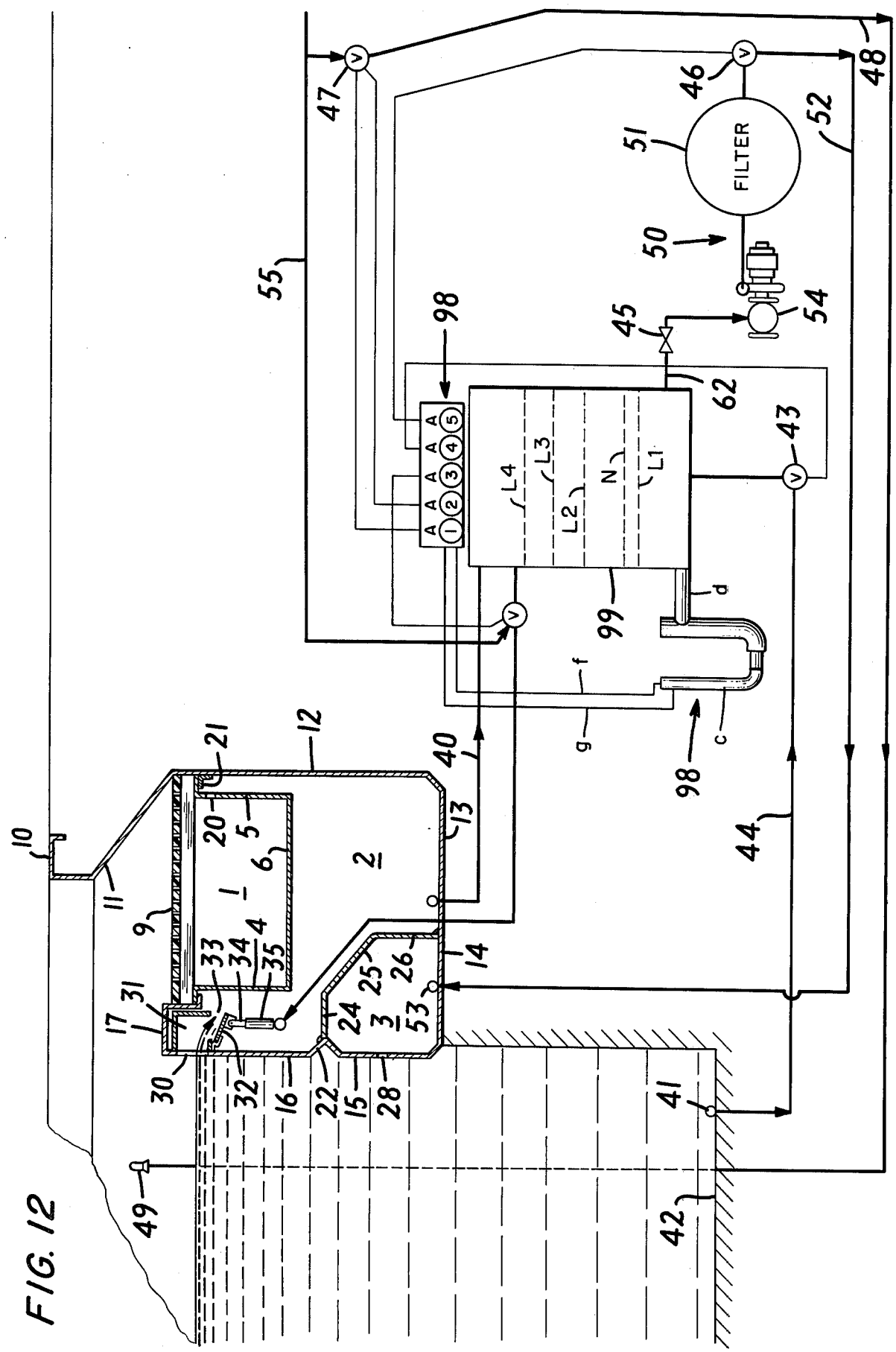
FIG. 12 is a pool water flow circuit diagram, showing a double-gutter pool perimeter water recirculation system with the device sensing increase in overflow in a balance tank in the gutter overflow line.
Figure 13:
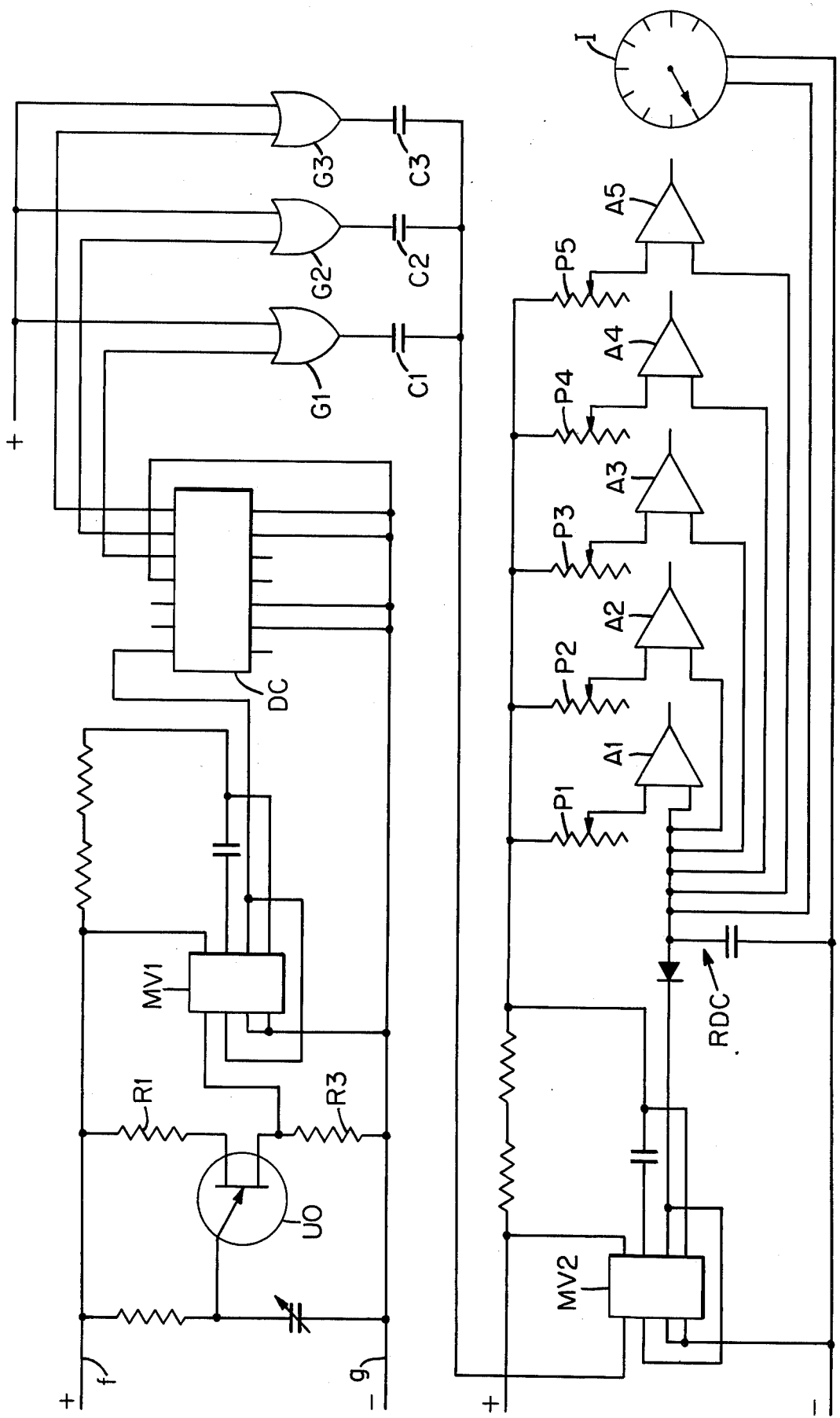
FIG. 13 is a wiring diagram showing an electric circuit for the water circulation system of FIG. 12.

A further modification of the water flow circulation layout for the pool perimeter gutter system shown in FIGS. 3 to 5 is shown in FIGS. 12 and 13. In this case, the sensor is arranged to sense water level in a balance tank 99 in the gutter overflow line 40. A vacuum filter tank can be substituted for the balance tank 99, in the same location, before the pump, with the sensors in the filter bed, and the filter 51 omitted.

There is a direct line connection 40 leading from the second gutter 2 and the first gutter 1 into the top of the balance tank 99, and then via balance tank line 62 to the recirculation system 50, and there is also a main drain 41 in the bottom 42 of the swimming pool leading via main drain line 44 to the bottom of tank 99. There is a main drain throttling valve 43 in the main drain line 44, so that this line can be closed off, or partially or fully opened, and there is also a valve 45 in the balance tank line 62, so that this can be closed off. On the downstream side of filter 51 in the water purifying system there is a recirculation flow throttling valve 46, which controls recirculation flow through the return feed line 52 leading to the water feed inlet 53 in the conduit 3. The valve 46 also can be partially or fully opened, or closed, increasing the recirculation flow or decreasing it, as may be required. The pump 54 maintains circulation of water through the filter 51 and return feed line 52 to the conduit 3.

There is also a make-up water valve 47 in fluid flow connection via a line 48 to the fillspout 49 on the deck of the pool, permitting introduction of fresh water from the water supply, such as, for example, the water main supply at the pool location.

The water level sensing system 98 of FIG. 12 senses water levels in the balance tank 99.

The sensor 98 senses and responds to a first level L1 of water in tank 99 corresponding to the predetermined minimum pool water level at which the pool water level is below skimming flow level at the lower rim of openings 30, and must be replenished. This sensor upon detecting such a low level responds by opening the make-up water valve 47, so that water is admitted from the feed line 55 into the line 48, and thence to the pool at fillspout 49.

When the pool is full, since the surge weir flaps 32 are open, in the position shown in FIGS. 3, 4, and 5, skimming flow takes place at a predetermined level through the weirs, and the gutter water level rises to level N. The sensing device 75 senses this higher level, and gives an electric signal via gates G1, G2, and G3, condensers C1, C2, and C3 to operational amplifier A2, and this turns off make-up water valve 47, and cuts off feed of fresh water to the pool.

The sensor 98 then senses a second and higher water level L2 in the tank 99, corresponding to the increased surge weir flow into the gutter under light pool activity. When the water level reaches L2, there is too much flow through the weirs, and it is necessary to close the surge weirs, to prevent excessive gutter flow. The sensor 98 responds to this condition by actuating the cylinder and pushing out the piston, closing the flaps 32, and closing off the weirs. In this condition, some surge flow cascades over the top of 17 of the perimeter gutter into gutter 1, but gutter 1 has adequate capacity to accommodate such flow.

A further increase in pool activity will lead to an increased flow of water across the top 17 of the perimeter gutter into the first gutter 1. Under medium pool activity, the flow fills the gutter 1, whereupon the excess spills over into the second gutter 2, through the passages 20. This increases the water flow in the second gutter, and in the gutter overflow return line 40, bringing the water level in the balance tank 99 to the level L3, sensed by the sensor 98, and increases the burden on the water recirculation system, which requires adjustment to accommodate the increased gutter flow.

Accordingly, the sensor 98 is in actuating connection with the main drain throttling valve 43, and closes the main drain valve, thus making it possible for the recirculation system 50 to accommodate the increased gutter overflow in line 40, the flow through which is now equal to that formerly reaching the balance tank 99 and recirculation system 50 from the combined volumes of the flows in the main drain line 44 and gutter overflow line 40.

Increased pool activity to the maximum activity level further increases the amount of water cascading across the top 17 of the perimeter gutter into gutter 1, and thence through the overflow openings 20 into the gutter 2, with the result that the level in tank 99 rises to level L4, sensed by the sensor 98. The sensor opens the recirculation flow throttling valve 46, increasing the rate (and therefore the volume amount) of recirculation flow through the recirculation system 50, so as to accommodate the increased flow through the gutters. This is so designed as to accommodate any maximum flow that may be encountered during maximum activity in the pool.

As pool activity decreases, and gradually returns to normal, the sensors are again actuated in the same order but in reverse sequence, so that the water recirculation system responds to the now decreased circulation through the gutters.

Thus, a decrease in the water level below level L4, sensed by sensor 98, results in a throttling back of recirculation flow throttling valve 46. When the level decreases further, to below level L3, the main drain throttling valve 43 is again opened. Further decrease to level L2 leads to the actuation via sensor 98 of the piston arrangement to open the flaps 32 and thus reopen the surge weirs, and this condition is maintained as long as the pool is quiescent, at normal pool operating level. If for some reason, as for example, through evaporation, the amount of water decreases, so that level L1 is reached, the sensor 98 opens the make-up valve 47, to restore the pool level to normal, whereupon the sensor shuts off the valve 47, thus ensuring adequate skimming flow during periods of quiescence.

The pool level and balance tank control system of FIG. 12, like that of FIGS. 3 to 7, is a water recirculating system which is controlled automatically by the swimming load. The most desirable of the various possible operating modes is selected automatically by the control system, dynamically guided by the amount of people in the pool, and their activity.

During quiescence (no persons in the pool) surface cleaning takes place through open surge weirs. As swimmers enter the pool causing displacement surge and waves, these weirs will automatically and positively close. As activity continues to increase, the main drain will close requiring all water from the swimming pool to be drawn from the perimeter overflow system channels. As the number of swimmers increases and the activity level increases, the recirculation (turnover) rate will automatically increase, improving the quality of filtration. As the bathers leave the pool, the recirculating rate will return to normal, and the main drain and surge weirs will open at predetermined levels, as the pool returns to its quiescent state. If after reaching quiescence the designed rate of surface cleaning is not being maintained, water will automatically be added to the swimming pool until this rate is achieved.

Functionally, the lower of the two gutters, the second gutter, accepts water through the surge weirs during quiescence, and continues to accept water until it reaches a predetermined level. At this level, the surge weirs automatically close, requiring all water to enter the first gutter of the perimeter overflow system by passing over the perimeter overflow system lip into the upper gutter. Water may flow from the upper first gutter directly to the filtration system, or it may pass through surge control ports into the lower second gutter. As the pool activity and number of swimmers decrease, the upper gutter will drain, the system will return to its normal recirculating rate, and the surge weirs will open.

The system thus responds automatically to user-activated dynamic demand, to determine the operating mode, continuously and automatically for the life of the swimming pool.

The water flow control system is consequently fully automatic, whether the flow to be accommodated is increasing or decreasing, and according to whether the activity in the pool is nil (quiescent), light, medium or heavy.

The perimeter gutters and weirs shown in FIGS. 3 to 13 are made of stainless steel, but it will, of course, be understood that other metals can be used, such as galvanized iron and steel, and aluminum, as well as anodized aluminum. Whatever the metallic material, its surface should be treated so as to render its corrosion-resistant, as by plating, galvanizing, anodizing, porcelain-enamel coating, or painting. It is also possible to form the perimeter gutter and/or the weir of plastic material, either in whole or in part. There are plastics now available which are sufficiently strong to withstand the wear and tear of a perimeter gutter system, including, for example, acrylonitrile-butadiene-styrene resin, polycarbonate resin, polytetrafluoroethylene, polyvinyl chloride, polyvinylidene chloride, polyesters, polypropylene, polyamides, and synthetic rubbers such as polyisoprene, polybutadiene, butadiene-styrene copolymers, and butadiene-isoprene copolymers.

The preferred construction is from a sheet or several sheets of metallic or plastic material, which are formed into the desired configuration, as is seen in the cross-sectional drawings. It is usually preferred that the coping portion at the top rear of the perimeter gutter extend at least partially, and preferably wholly, across an open gutter trough, so as to prevent people from stepping or falling into the gutter. Such can also be prevented by covering the gutter with a grating or grid of metal or plastic, the same or different material from the gutter.

The use of modular units such as are shown in FIGS. 3 to 13 is preferred, because this permits mass production of the gutter and weir system at a point remote from the swimming pool, with easy and inexpensive transportation from that point to swimming pool construction sites anywhere in the world. The modular units can then be assembled on-site to form any type or configuration of swimming pool, and any desired weir arrangement. The modular units can be made in straight sections for rectangular or other straight-sided pool shapes, while curved sections can be made for pear-shaped, elliptical, circular, or other curved-side pool configurations.

The modular units can be fitted together by welding, soldering or brazing, in the case of metal units; by bonding, using various types of adhesives, in the case of metal or plastic units; or by heat-sealing, ultrasonic welding, or heat-bonding, in the case of thermoplastic plastic units. Plastic units which are not fully heat-cured can be bonded and then cured in situ to form a permanent bond on site, in the course of construction of the pool.

The perimeter gutter and weir system of the invention can be used completely around the perimeter of a pool, or only partially around the pool perimeter, as desired. The most uniform skimming action and gutter action is, of course, obtained when the entire perimeter of the pool is provided with such a gutter and weir.

While construction of the gutter and weir in the form of modular units has been described, it will also be appreciated from FIGS. 3 to 13 that the gutter and weir system can be formed on-site in the configurations shown using concrete or plastic material, and can form an integral part of the pool wall, by casting or pouring into suitable frames, so that the material can harden and set in the desired pool and skimmer outlet shape. The construction of the gutter system is sufficiently simple so that this type of technique can be employed with good results. Since this requires more hand-work, however, and is therefore a more costly method of construction, it would not usually be preferred, particularly in the case of large pools, where construction costs may be too high to permit the luxury of a hand-made gutter system on the pool site.

The gutter and weir system can also be made from bricks or tiles, which are built up in the desired configuration. These can be the usual types of materials, preferably with a ceramic facing, so that it is leak-proof, with the tiles being bonded together with water-resistance adhesive or cement.

The swimming pool can be equipped with any type of water filtration and cleaning recirculation system. The gutters usually feed water therein to such systems by gravity. However, recirculation pumps can be provided, and the gutters can also be provided with jet water inlets to direct a driving flow of water along the gutter, to flush out the gutters, and to drive water along the gutter towards the water recirculation system. Such jet water inlets are described in U.S. Pat. No. 2,932,397 to Ogden, dated Apr. 12, 1960.

Other variations and modifications of the invention will be apparent to those skilled in the art.

Having regard to the foregoing disclosure, the following is claimed as the inventive and patentable embodiments thereof:

1. A liquid level sensing and control device comprising, in combination, a U-tube having substantially vertical legs connected by another member putting the legs in fluid flow intercommunication at their lower ends; a variable capacitor in one leg of the U-tube, comprising two spaced electrodes; a first mobile body in said one leg of a first dielectric liquid capable of rising and falling within the space between the electrodes and to a level at which it partially or fully fills the space; a second mobile body in said one leg of a second liquid having a higher density than and immiscible with the dielectric liquid and having an upper surface on which rests the first body of dielectric liquid; a third mobile body in the second leg of a third liquid immiscible with the second liquid and disposed in operative relationship with the second body of liquid; and a fluid line connection putting said third body of liquid into contact with a fourth body of the same or different liquid whose liquid level is to be sensed, the third body moving in the U-tube to a changed position in response to change in hydrostatic fluid pressure communicated from the fourth body to said third body as a function of fluid level of the fourth body so that the relative level of said first body of first liquid in the space between the electrodes in the variable capacitor is related to liquid level in said fourth body, communicated as fluid pressure via the fluid pressure communication to said third body, the third body thereby moving the second body of liquid and the second body of liquid moving the first body of liquid in the U-tube to a level related to liquid level in said fourth body, and corresponding to a capacitance of the variable capacitor; and means sensing at least one selected capacitance of the variable capacitor and initiating a control reaction responsive thereto.

2. A liquid level sensing device according to claim 1, in which one electrode is of aluminum, and the other is of copper.

3. A liquid level sensing device according to claim 2, in which the copper electrode is a wall of the one leg of the U-tube, and the aluminum electrode is disposed in the leg spaced from the copper wall thereof.

4. A liquid level sensing device according to claim 1, in which the first dielectric liquid is mineral oil, and the second liquid is mercury.

5. A liquid level sensing device according to claim 1, in which the third and fourth bodies are of the same liquid.

6. A liquid level sensing device according to claim 5, in which the same liquid is water.

7. A liquid levelسensing device according to claim 1, in which the electrodes are in electric connection with a control circuit detecting in terms of capacitance of the capacitor a plurality of levels of dielectric liquid in the space between the electrodes of the variable capacitor, each level modifying the capacitance of the capacitor by a measurable amount.

8. A liquid level sensing device according to claim 7, comprising electrical circuitry responsive to such capacitance changes for control of a sequence of operations in a water circulation system for each new level sensed in the body of liquid.

9. A fully automated water level and skimming flow perimeter gutter control system for swimming pools comprising a gutter receiving overflow, including surge flow and/or skimming flow, across the top of the perimeter gutter and adequate for normal and surge flow conditions, in combination with a level-sensing device as defined in claim 1, operating from fluid pressure corresponding to the level of water in the pool overflow.

10. A fully automated water level and skimming flow perimeter gutter control system for swimming pools according to claim 9, comprising a second gutter receiving skimming flow and also providing additional gutter capacity for extraordinary overflow, including relief flow from the first gutter in the event of considerable activity in the pool.

11. A fully automated water level and skimming flow perimeter gutter control system for swimming pools according to claim 9, in which the liquid level sensing device operates from fluid pressure corresponding to the level of water in the gutter conduit to control the skimming flow and water recirculation between the pool and the gutter, and feed from a water make-up supply.

12. A fully automated water level and skimming flow perimeter gutter control system for swimming pools according to claim 9, in which the liquid level sensing device operates from a balance tank, to control the skimming flow and water recirculation between the pool and the gutter, and feed from a water make-up supply.

13. A fully automated water level and skimming flow perimeter gutter control system for swimming pools according to claim 9, in which the liquid level sensing device operates from a balance line, to control the skimming flow and water recirculation between the pool and the gutter, and feed from a water make-up supply.

14. A fully automated water level and skimming flow perimeter gutter control system for swimming pools according to claim 9, in which the liquid level sensing device operates from a vacuum filter tank to control the skimming flow and water recirculation between the pool and the gutter, and feed from a water make-up supply.

15. A fully automated water level and skimming flow perimeter gutter control system for swimming pools according to claim 9, in which the device senses a selected capacitance corresponding to a first level of water in the overflow corresponding to below-normal skimming flow, and when this is below a predetermined level, gives an electric signal that opens a make-up valve controlling feed of fresh water from a supply or the water main; and when the pool level reaches a second higher overflow level, at which skimming flow via surge weirs or a skimming gutter proceeds, and overflows into the gutter, the device senses a selected capacitance corresponding to that level and gives a signal that closes the make-up water valve.

16. A fully automated water level and skimming flow perimeter gutter control system for swimming pools according to claim 15, in which the device senses a third selected capacitance corresponding to a third overflow water level and gives an electric signal to increase the recirculation system capacity for gutter flow by closing off the main drain valve, causing all recirculation water between the pool and the pool recirculation system to flow into the system from the gutter.

17. A fully automated water level and skimming flow perimeter gutter control system for swimming pools according to claim 16, in which the device senses a fourth selected capacitance corresponding to a fourth overflow water level and gives an electric signal that opens a recirculating flow throttling control valve on the return line of the recirculation system.

18. A fully automated water level and skimming flow perimeter gutter control system for swimming pools according to claim 15, in which the device senses a third selected capacitance corresponding to a third overflow water level and gives an electric signal that opens a recirculating flow throttling control valve on the return line of the recirculation system.

19. A fully automated water level and skimming flow perimeter gutter control system for swimming pools according to claim 15, in which the gutter system includes at least one surge weir, and the device senses a third selected capacitance corresponding to a third higher overflow water level, and corresponding to a low activity pool condition, in which the overflow level is above the normal skimming flow sensed in the pool by the device, and gives an electric signal that actuates a mechanism closing off the surge weirs, arresting skimming flow through the weirs, and retaining the water in the pool, but allowing skimming flow and/or surges to proceed across the top of the perimeter gutter, into the gutter.

20. A fully automated water level and skimming flow perimeter gutter control system for swimming pools according to claim 19, in which the device senses a fourth selected capacitance corresponding to a fourth overflow water level and gives an electric signal to increase the recirculation system capacity for gutter flow by closing off the main drain valve, causing all recirculation water between the pool and the pool recirculation systems to flow into the system from the gutter.

21. A fully automated water level and skimming flow perimeter gutter control system for swimming pools according to claim 19, in which the device senses a fourth selected capacitance corresponding to a fourth overflow water level and gives an electric signal that opens a recirculating flow throttling control valve on the return line of the recirculation system.

22. An automated pool perimeter skimming gutter water level control system comprising, in combination, a gutter conduit for disposition about the perimeter of a swimming pool, and adapted to carry water at a level below a predetermined level of water in the swimming pool; a retaining wall on the pool side of the gutter conduit, over the top of which wall water may flow from the pool into the gutter conduit, the top of the wall being placed at a height to maintain a predetermined water level in the pool, to provide a skimming flow of water over the top of such predetermined water level in the pool, and to allow excessive flows, wave actions and surges to flow over the top of the wall into the gutter conduit; a water cleaning and recirculating system for collecting water from the pool and water flowing into and along the gutter conduit, cleaning it, and returning it to the pool; and a water level sensing device of claim 1, sensing, in sequence, a first selected capacitance corresponding to a first water level in the overflow downstream of the pool corresponding to a less than the predetermined water level in the pool, and responding by giving an electric signal to feed water to the pool, a second selected capacitance corresponding to a second water level in the overflow downstream of the pool characteristic of normal quiescent pool skimming flow and responding by giving an electric signal to stop water feed initiated at the first overflow level; and a third selected capacitance corresponding to a third higher water level in the overflow downstream of the pool characteristic of a high degree of water flow wave action and surges into the gutter conduit, and responding by giving an electric signal to increase water recirculation system capacity for overflow and thereby recirculate such increased overflow and prevent wash-back from a gutter conduit to the pool.

23. An automated pool perimeter skimming gutter water level control system comprising, in combination, a gutter conduit for disposition about the perimeter of a swimming pool, and adapted to carry water at a level below a predetermined level of water in the swimming pool; a retaining wall on the pool side of the gutter conduit, over the top of which wall water may flow from the pool into the gutter conduit; at least one surge weir disposed through the retaining wall below the top thereof, at a height to maintain a predetermined water level in the pool, and to provide a skimming flow of water through the weir at such predetermined water level in the pool, the top of the wall being spaced above the weir at a height to retain the pool water within the pool perimeter when the weir is closed at water flow, wave actions and surges up to a predetermined minimum, while allowing excessive flows, wave actions and surges to flow over the top of the wall into the gutter conduit; a water cleaning and recirculating system for collecting water from the pool and water flowing into and along the gutter conduit, cleaning it, and returning it to the pool; and a water level sensing device of claim 1 sensing, in sequence, a first selected capacitance corresponding to a first water level in the gutter corresponding to a less than the predetermined water level in the pool, and responding by giving an electric signal to feed water to the pool; a second selected capacitance corresponding to a second water level in the gutter characteristic of normal quiescent pool skimming flow and responding by giving an electric signal to stop water feed initiated at the first gutter level; and a third selected capacitance corresponding to a third gutter higher level in the gutter characteristic of a high degree of water flow wave action and surges into the gutter conduit, and responding by giving an electric signal to increase water recirculation system capacity to recirculate such increased gutter flow and prevent wash-back from a gutter conduit to the pool.

24. An automated pool perimeter skimming gutter water level control system according to claim 23, in which the water level sensing device senses a first selected capacitance corresponding to a first water level corresponding to a less than the predetermined water level in the pool, and responds to feed water to the pool;

senses a second selected capacitance corresponding to a second higher water level in the gutter characteristic of normal quiescent pool skimming flow, and responds to stop water feed initiated by the first overflow sensor; senses a third selected capacitance corresponding to a third higher water level in the gutter characteristic of a low threshhold of pool activity but excessive weir skimming flow, and responds to close at least one weir; and senses a fourth selected capacitance corresponding to a fourth higher level in the gutter characteristic of a high degree of water flow, wave action and surges into the gutter conduit, and responds to increase water recirculation system capacity to recirculate such increased overflow and prevent wash-back from a gutter conduit to the pool.

25. A twin-gutter automated pool perimeter skimming gutter water level control system comprising, in combination, a first gutter conduit for disposition about the perimeter of a swimming pool, and adapted to carry water at a level below a predetermined level of water in the swimming pool; a second gutter conduit for disposition about the perimeter of a swimming pool, and adapted to carry water at a level below a predetermined level of water in the swimming pool; a retaining wall on the pool side of the gutter conduit, over the top of which wall water may flow from the pool into a gutter conduit; the top of the wall being placed at a height to maintain a predetermined water level in the pool, to provide a skimming flow of water at such predetermined water level in the pool, and to allow excessive flows, wave actions, and surges to flow over the top of the wall into a gutter conduit; a water cleaning and recirculating system for collecting water from the pool and water flowing into and along the first and second gutter conduits, cleaning it, and returning it to the pool; and a water level device of claim 1 sensing a first selected capacitance corresponding to a first water level in the overflow downstream of the pool corresponding to a less than the predetermined water level in the pool, and responding by giving an electric signal to feed water to the pool; a second selected capacitance corresponding to a second water level in the overflow downstream of the pool characteristic of normal quiescent pool skimming flow and responding by giving an electric signal to stop water feed; and a third selected capacitance corresponding to a third higher level in the overflow downstream of the pool characteristic of a high degree of water flow, wave action and surges into the gutter conduit, and responding by increasing water recirculation system capacity to recirculate such increased overflow and prevent wash-back from a gutter conduit to the pool.

26. An automated pool perimeter skimming gutter water level control system comprising, in combination, a first gutter conduit for disposition about the perimeter of a swimming pool, and adapted to carry water at a level below a predetermined level of water in the swimming pool; a retaining wall on the pool side of the gutter conduit over the top of which wall water may flow from the pool into the gutter conduit; a second gutter conduit for disposition about the perimeter of a swimming pool, and adapted to carry water at a level below a predetermined level of water in the swimming pool; at least one surge wier disposed through the retaining wall below the top thereof, at a height to maintain a predetermined water level in the pool, and to provide a skimming flow of water through the weir at such predetermined water level in th pool, the top of the wall being spaced above the weir at a height to retain the pool water within the pool perimeter when the weir is closed at water flows, wave actions and surges up to a predetermined minimum, while allowing excessive flows, wave actions and surges beyond such minimum to flow over the top of the wall into the first gutter conduit; a water cleaning and recirculating system for collecting water from the pool and water flowing into and along the first and second gutter conduits, cleaning it, and returning it to the pool; and a water level sensing device of claim 1 sensing a first selected capacitance corresponding to a first water level in the overflow downstream of the pool corresponding to a less than the predetermined water level in the pool, and responding by giving an electric signal to feed water to the pool; a second selected capacitance corresponding to a second water level in the overflow downstream of the pool corresponding to a second higher water level characteristic of normal quiescent pool skimming flow and responding by giving an electric signal to stop water feed; a third selected capacitance corresponding to a third higher level in the overflow downstream of the pool characteristic of a low threshold of pool activity but excessive weir skimming flow, and responding by giving an electric signal to close at least one weir; and a fourth selected capacitance corresponding to a fourth higher level in the overflow downstream of the pool characteristics of a high degree of water flow, wave action and surges into the first gutter conduit, and responding by giving an electric signal to increase water recirculation system capacity to recirculate such increased overflow and prevent wash-back from a gutter conduit to the pool.

* * * * *